United States Patent
Kawaguchi et al.

(10) Patent No.: US 7,531,488 B2
(45) Date of Patent: *May 12, 2009

(54) LUBRICATING OIL FOR REFRIGERATOR WITH COMPRESSOR

(75) Inventors: Yasuhiro Kawaguchi, Kimitsu-gun (JP); Nobuaki Shimizu, Kimitsu-gun (JP); Masato Kaneko, Ichihara (JP); Hiroshi Nagakawa, Tokyo (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 937 days.

This patent is subject to a terminal disclaimer.

(21) Appl. No.: 09/939,599

(22) Filed: Aug. 28, 2001

(65) Prior Publication Data

US 2002/0077255 A1    Jun. 20, 2002

Related U.S. Application Data

(63) Continuation of application No. 07/502,872, filed on Apr. 2, 1990, now Pat. No. 6,458,288, which is a continuation-in-part of application No. 07/444,932, filed on Dec. 4, 1989, now abandoned.

(30) Foreign Application Priority Data

| Dec. 6, 1988 | (JP) | ............................. | 1988-306920 |
| Dec. 13, 1988 | (JP) | ............................. | 1988-313053 |
| Mar. 6, 1989 | (JP) | ............................. | 1989-051875 |
| Mar. 7, 1989 | (JP) | ............................. | 1989-052822 |
| Mar. 31, 1989 | (JP) | ............................. | 1989/078171 |
| Mar. 31, 1989 | (JP) | ............................. | 1989/078172 |
| Apr. 21, 1989 | (JP) | ............................. | 1989-100186 |

(51) Int. Cl.
*C10M 107/34* (2006.01)
*C09K 5/00* (2006.01)

(52) U.S. Cl. ...................................... 508/579; 252/68

(58) Field of Classification Search ................. 508/579; 252/68

See application file for complete search history.

(56) References Cited

U.S. PATENT DOCUMENTS

| 3,966,625 A * | 6/1976 | Tanizaki et al. ............. 508/579 |
| 4,248,726 A | 2/1981 | Uchinuma et al. |
| 4,267,064 A | 5/1981 | Sasaki et al. |
| 4,282,386 A | 8/1981 | Donate et al. |
| 4,454,052 A | 6/1984 | Shoji et al. |
| 4,455,247 A | 6/1984 | Nakayama et al. |
| 4,557,850 A | 12/1985 | Ando et al. |
| 4,624,299 A * | 11/1986 | Harding et al. ........ 165/104.19 |
| 4,719,025 A * | 1/1988 | Akiyama et al. ............ 508/499 |
| 4,755,316 A | 7/1988 | Magid et al. |
| 4,948,525 A | 8/1990 | Sasaki et al. |
| 6,458,288 B1 * | 10/2002 | Kawaguchi et al. ........... 252/68 |
| 2002/0077255 A1 | 6/2002 | Kawaguchi et al. |

FOREIGN PATENT DOCUMENTS

| EP | 0 336 171 A1 | 10/1989 |
| EP | 0 343 662 A2 | 11/1989 |
| GB | 2121818 | 1/1984 |
| JP | 55-161895 | 12/1980 |
| JP | 58-103594 | 6/1983 |
| JP | 59-021632 | 2/1984 |

OTHER PUBLICATIONS

U.S. Appl. No. 12/093,727, filed May 15, 2008, Kaneko.

* cited by examiner

*Primary Examiner*—Ellen M. McAvoy
(74) *Attorney, Agent, or Firm*—Oblon, Spivak, McClelland, Maier & Neustadt, P.C.

(57) ABSTRACT

Disclosed is a lubricating oil for compression-type refrigerator comprising, as a main component, a polyoxyalkyleneglycol derivative represented by the general formula:

$$R^1[(OR^2)mOR^3]n$$

wherein symbols are as defined in the specification. Said lubricating oil has a favorable compatibility with refrigerants and an excellent lubricating property, and is utilized as the lubricating oil for compression-type refrigerator employing hydrogen-containing fluorocarbon compound refrigerants including R-134a or fluorocarbon compound refrigerants without hydrogen.

6 Claims, No Drawings

LUBRICATING OIL FOR REFRIGERATOR WITH COMPRESSOR

This application is a Continuation application of application Ser. No. 07/502,872, filed Apr. 2, 1990, now U.S. Pat. No. 6,458,288 which is a Continuation-in-part application of application Ser. No. 07/444,932, filed Dec. 4, 1989 now abandoned.

BACKGROUND OF THE INVENTION

1. Field of the Invention

The present invention relates to a novel lubricating oil for refrigerators with a compressor. More particularly, it relates to a lubricating oil for refrigerators with a compressor (compression-type refrigerators), comprising as the main component a polyoxyalkyleneglycol derivative having a high lubricating property as well as a favorable compatibility with hydrogen-containing fluorocarbon compounds such as 1,1,1,2-tetra-fluoroethane (hereinafter referred to as R-134a), which can substitute for Freon compounds such as dichlorodifluoromethane (hereinafter referred to as R-12) used as refrigerant and involved in environmental pollution problems.

2. Description of the Related Arts

Generally, a compression-type refrigerator is constituted of a compressor, a condenser, expansion bulbs, and an evaporator, having a mechanism where the mixture of the refrigerant and the lubricating oil is circulating in a closed system. In such a refrigerator, though it depends on the kind of apparatus, usually the temperature in the compressor rises to 40° C. or more, while in the cooler, the temperature comes to be so low as −40° C. Accordingly, the refrigerant and the lubricating oil must circulate in the said system without phase separation in the said temperature range of −40° C. to +40° C. in most cases.

If phase separation is caused while the running of the refrigerator, a seriously detrimental effect occurs affecting the life and efficiency of the apparatus. For example, if phase separation of the refrigerant and the lubricating oil is caused in the compressor, moving parts become underlubricated resulting in seizure or other troubles, which shorten the life of the apparatus considerably. If phase separation is caused in the evaporator, a lubricating oil having a high viscosity results, which brings lowering of efficiency in heat exchange.

Since a lubricating oil for refrigerators is used for the purpose of lubricating the moving parts of the refrigerator, its lubricating ability is regarded important as a matter of course. Particularly in the compressor, the temperature becomes so high that a viscosity, sufficient to retain the oil film necessary for lubricating, is important. Necessary viscosity varies with the kinds or running conditions of the compressor, but usually the preferable viscosity of the lubricating oil before blended with refrigerant is 2 to 250 cSt at 100° C. If the viscosity is lower than that range, the oil film becomes thinner thereby causing underlubricating and sealing properties become poor, while if the viscosity is higher than the above, the efficiency in heat exchange is reduced. Since lubricating oils for refrigerator are used in circulation in a wide range of high to low temperatures, its viscosity index is preferably high, and usually a viscosity index of 40 or more is required. Further, in addition to the above properties, a low hygroscopicity to prevent the blocking of the bulb caused by icing at the expansion bulb and other properties are required.

Heretofore, as the refrigerant for compression-type refrigerators, R-12 has often been used, and as the lubricating oil, various mineral oils and synthetic oils satisfying the required properties mentioned before have been used. R-12, however, has recently been restricted more and more severely all over the world, for it is liable to cause environmental pollution including destruction of the ozonosphere.

In these circumstances, hydrogen-containing fluorocarbon compounds including R-134a have attracted attention, as new refrigerants. Among the hydrogen-containing fluorocarbon compounds, R-134a especially has only a small possibility of destroying the ozonosphere, and can substitute for R-12, with little change in structure of the conventional refrigerators, and accordingly is favorable as a refrigerant for compression-type refrigerators.

When the hydrogen-containing fluorocarbon compounds including said R-134a are employed as the refrigerant for compression-type refrigerators in place of R-12, the desirable lubricating oils come to be those having high compatibility with the hydrogen-containing fluorocarbon compounds including R-134a, and also having high lubricating properties enough to satisfy the required properties mentioned above.

However, since the conventional lubricating oils which have been used with R-12 do not have a favorable compatibility with the hydrogen-containing fluorocarbon compounds including R-134a, a new lubricating oil suitable to these compounds consequently is required. In that case, particularly in the air-conditioner for automobiles, it is required that the construction of the mechanism be hardly changed on the occasion of substituting for R-12. It is not desirable to change widely the construction of the present mechanism because of lubricating oil. Accordingly, a lubricating oil having a very favorable compatibility with the hydrogen-containing fluorocarbon compounds, including R-134a, is required.

As lubricating oils having compatibility with R-134a, Ulcon LB-165 or Ulcon LB-525 (Trade Mark, both produced by Union Carbide Co., Ltd.) composed of polyalkyleneglycol have been known, and it was reported that these lubricating oils are dissolved or compatible with R-134a in all proportions at a low temperature of −50° C. or lower ("Research Disclosure", No. 17463 (October, 1978)). Moreover, a high viscosity refrigerator oil composition of which the base oil is poly-oxypropyleneglycolmonobutylether is known (Japanese Patent Publication No. 42119/1982). These lubricating oils are polyalkyleneglycol derivatives having polypropylene glycol with a hydroxyl group at one of the terminals and a n-butyl ether bond (a n-butoxy group) at the other terminal. They have a comparatively favorable compatibility with R-134a at low temperatures, but they do not have sufficient compatibility with R-134a at high temperatures, and for example, Ulcon LB-525 mentioned above is known to cause phase separation with R-134a at room temperature (Specification of U.S. Pat. No. 4,755,316).

On the other hand, a polyglycol having at least two hydroxyl groups in a molecule is proposed to be a favorable substance compatible with R-134a (Specification of U.S. Pat. No. 4,755,316).

In the said polyglycol, however, the compatibility is not necessary sufficient.

Meanwhile, it is known that polyglycol generally shows a temperature dependency that when the mixture with a fluorocarbon or chlorofluorocarbon compound is heated from a low temperature to a high temperature, then the mixture phase-separated is once dissolved and phase-separated again.

On the other hand, R-134a and compounds which can dissolve it were proposed for use in absorption-type refrigerators (Japanese Patent Kokai No. 79175/1989). Said absorption-type refrigerators, however, are quite different in mechanism from the before-mentioned compression-type refrigerators, and tetraethylene-glycoldimethylether described in the Examples of the above-described Kokai is not proper as a lubricating oil for compression-type refrigerators because of its particularly low viscosity.

As described above, lubricating oil for compression-type refrigerators having sufficiently favorable compatibility with R134a as well as high lubricating properties have not been found yet, and their development has been eagerly desired.

Replying to these requirements, the present inventors have earnestly studied to develop a lubricating oil suitable to compression-type refrigerators employing, as the refrigerant, hydrogen-containing fluorocarbon compounds including R-134a which are able to substitute for R-12 now involved in environmental pollution problems and other fluorocarbon compounds which are difficult to decompose.

SUMMARY OF THE INVENTION

The object of the present invention is to provide a lubricating oil for compression-type refrigerators, having a favorable compatibility with hydrogen-containing fluorocarbon compounds including R-134a as the refrigerant.

Another object of the present invention is to provide a lubricating oil for compression-type refrigerators, having a favorable compatibility with the above-described hydrogen-containing fluorocarbon compounds over the whole temperature range of application.

A further object of the present invention is to provide a lubricating oil for compression-type refrigerators, which has a favorable compatibility and also a high lubricating properties as described above.

A still further object of the present invention is to provide a lubricating oil for compression-type refrigerators, which has an excellent anti-seizure property in addition to the above-described properties.

The present invention comprises the following Lubricating Oil I to Lubricating Oil VII.

Lubricating Oil I

A lubricating oil for compression-type refrigerators, comprising, as the main component, at least one polyoxyalkyleneglycol derivatives represented by the general formula:

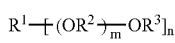
(I)

wherein $R^1$ indicates an alkyl group having 1 to 10 carbon atoms, an acyl group having 1 to 10 carbon atoms or an aliphatic hydrocarbon group having 2 to 6 valencies, $R^2$ is an alkylene group having 2 to 4 carbon atoms, $R^3$ is an alkyl group having 1 to 10 carbon atoms, or an acyl group having 1 to 10 carbon atoms. n indicates an integer of 1 to 6, and m is an integer of 1 to 80.

Lubricating Oil II

A lubricating oil for compression-type refrigerators, comprising, as the main component, a polyoxyalkyleneglycol derivative represented by the general formula:

$$R^4(OR^5)_k OH \quad (I)$$

wherein $R^4$ indicates an alkyl group having 1 to 3 carbon atoms, $R^5$ indicates an alkylene group having 2 to 4 carbon atoms, and k indicates a number of 6 to 80.

Lubricating Oil III

A lubricating oil for compression-type refrigerators, comprising, as the main component, polyoxyalkyleneglycol derivatives of ethyleneoxide-propyleneoxide copolymer represented by the general formula:

(III)

and/or the general formula:

(IV)

wherein $R^6$, $R^7$, $R^8$, $R^9$ and $R^{10}$ indicate each a hydrogen or an alkyl group having 1 to 3 carbon atoms, A is a polymerization chain of ethyleneoxide and propyleneoxide, consisting of p-times ethyleneoxide units and q-times propyleneoxide units, and p and q are numbers satisfying the requirements:

$$0.1 \leq p/q = 10, 5 \leq p+q \leq 100.$$

Lubricating Oil IV

A lubricating oil for compression-type refrigerators, characterized by compounding a phosphate represented by the general formula:

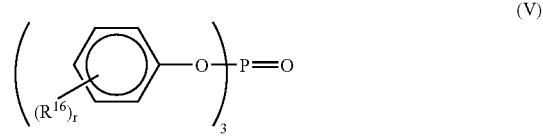
(V)

wherein $R^{16}$ indicates a hydrogen or an alkyl group having 1 to 3 carbon atoms, r indicates an integer of 1 or 2, when r is 2, $R^{16}$s may be identical or different and the total carbon number of $(R^{16})_r$ is not more than 3, with a base oil comprising, as the main component, polyoxyalkyleneglycol derivatives represented by the general formula:

(VI)

and/or the general formula:

(VII)

wherein $R^{11}$ to $R^{15}$ indicate each a hydrogen or an alkyl group having 1 to 3 carbon atoms, and $A^1$ to $A^3$ indicate each polymerization chains consisting of 3 to 100 alkyleneoxide units of one kind or plural kinds, having 2 to 4 carbon atoms.

Lubricating Oil V

A lubricating oil for compression-type refrigerators, comprising, as the main component, polyoxyalkyleneglycol derivatives represented by the general formula:

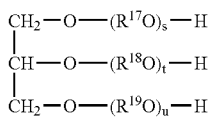

wherein $R^{17}$, $R^{18}$ and $R^{19}$ indicate each an alkylene group having 2 to 4 carbon atoms, and s, t and u indicate each an integer of 1 to 30, and having a viscosity at 40° C. of 50 to 250 cSt.

Lubricating Oil VI

A lubricating oil for compression-type refrigerator characterized by containing (a) polyoxyalkyleneglycol derivatives and (b) at least one compound selected from the group consisting of (i) dibasic acid ester, (ii) fluorinated oil, (iii) polyhydric alcohol ester, and (iv) silicone fluoride.

Lubricating Oil VII

A lubricating oil for refrigerator with compressor containing as the main component a polyoxyalkyleneglycol derivative represented by the general formula:

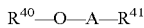  (XIV)

wherein $R^{40}$ is an unsaturated hydrocarbon group having 2 to 10 carbon atoms (excluding aromatic hydrocarbon groups), A indicates a polymerization chain consisting of 3 to 90 alkyleneoxide units of one or plural kinds, having 2 to 4 carbon atoms, $R^{41}$ is a hydrogen, an alkyl group having 1 to 20 carbon atoms, an alkenyl group having 2 to 20 carbon atoms, an alkynyl group having 2 to 20 carbon atoms, an aryl group having 6 to 20 carbon atoms, an aralkyl group having 7 to 20 carbon atoms or a cycloalkyl group having 4 to 20 carbon atoms. Additional Lubricating Oils including Lubricating Oil VIII and IX will be described hereinafter in greater detail.

DESCRIPTION OF PREFERRED EMBODIMENTS

First, Lubricating Oil I will be explained. Said Lubricating Oil I comprises as the main component a polyoxyalkyleneglycol derivative represented by the general formula (I) as described before.

In the formula, $R^1$ is an alkyl group having 1 to 10 carbon atoms, an acyl group having 1 to 10 carbon atoms, or an aliphatic hydrocarbon group having 2 to 6 valencies, $R^2$ is an alkylene group having 2 to 4 carbon atoms, $R^3$ is an alkyl group having 1 to 10 carbon atoms, or an acyl group having 1 to 10 carbon atoms, n is an integer of 1 to 6, and m is an integer of 1 to 80.

The alkyl group may be a straight chain alkyl group, branched chain alkyl group or cyclic alkyl group. Specific examples of these alkyl groups are a methyl group, an ethyl group, a n-propyl group, an isopropyl group, various butyl groups, various pentyl groups, various hexyl groups, various heptyl group, various octyl groups, various nonyl groups, various decyl groups, a cyclopentyl group, a cyclohexyl group and the like. If the carbon number of said alkyl group is in excess of 10, the compatibility with R-134a is reduced, which causes phase separation. The preferable carbon number of alkyl groups is 1 to 6. The most preferred lubricating oils of those represented by formula (I) are those wherein the $R^1$ and $R^2$ groups are alkyl groups, especially methyl groups.

The alkyl group in the acyl group may be a straight chain-, a branched chain-, or a cyclic alkyl group. Specific examples of the alkyl group in the acyl group are a methyl group, an ethyl group, an n-propyl group, an isopropyl group, various butyl groups, various pentyl groups, various hexyl groups, various heptyl groups, various octyl groups, various nonyl groups, a cyclopentyl group, a cyclohexyl group and the like.

If the carbon number of said acyl group is in excess of 10, the compatibility with R-134a is reduced, which causes phase separation. The preferable carbon number of the acyl group is 2 to 6.

When said $R^1$ and $R^3$ are each an alkyl group or an acyl group, $R^1$ and $R^3$ may be identical or different from each other.

Further, when n is 2 or more, plural $R^3$ in one molecule may be identical or different.

In case $R^1$ is an aliphatic hydrocarbon group having 1 to 10 carbon atoms and 2 to 6 valencies, said aliphatic hydrocarbon group may be a chain or a cyclic group. Examples of aliphatic hydrocarbon groups having two valencies are an ethylene group, a propylene group, a butylene group, a pentylene group, a hexylene group, a heptylene group, an octylene group, a nonylene group, a decylene group, a cyclopentylene group), and a cyclohexylene group. Examples of aliphatic hydrocarbon group having 3 to 6 valencies are residues resulting from removing a hydroxyl group from polyhydric alcohols such as trimethylol propane, glycerol, pentaerithritol, sorbitol, 1,2,3-trihydroxycyclohexane, and 1,3,5-trihydroxycyclohexane.

If the carbon number of said aliphatic hydrocarbon group is in excess of 10, the compatibility with R-134a is reduced, which causes phase separation. The preferable carbon number is 2 to 6.

In the before-mentioned general formula (I), $R^2$ is an alkylene group having 2 to 4 carbon atoms, and as the oxyalkylene group of the repeating unit, an oxyethylene group, an oxypropylene group, and an oxybutylene group are specified. oxyalkylene groups in one molecule may be identical or may vary in two or more kinds, but preferably at least an oxypropylene unit is contained in one molecule.

In the general formula (I), n is an integer of 1 to 6, and defined according to the number of valencies of $R^1$. For example, when $R^1$ is an alkyl group or an acyl group, n is 1. When $R^1$ is an aliphatic hydrocarbon group having 2,3,4,5 or 6 valencies, n comes to be 2,3,4,5 or 6, respectively. m is an integer of 1 to 80, and if m is beyond the said range, the object of the present invention cannot attained sufficiently.

The general formula (I) means not only one kind of polyoxyalkyleneglycol derivatives but also a mixture of two or more kinds of the derivatives.

The polyoxyalkyleneglycol derivatives represented by the general formula (I) used in the said Lubricating Oil I can be produced according to various methods shown below.

Method (A):

Alkyleneoxide having 2 to 4 carbon atoms including ethyleneoxide and propyleneoxide are polymerized with water or alkali hydroxide as an initiator, to obtain a polyoxyalkyleneglycol having hydroxyl groups at the both terminals, represented by the general formula:

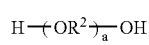  (A₁)

wherein a is a number of which mean value is 6 to 80, and $R^2$ is as defined before. Subsequently, both the hydroxyl groups of said polyoxyalkyleneglycol are etherified or esterified or one of the hydroxyl groups is etherificated and the other hydroxyl group is esterified to obtain a polyoxyalkyleneglycol derivative represented by the general formula:

(A₂)

wherein R and R' are each an alkyl group or an acyl group having 1 to 10 carbon atoms, and they may be identical or different each other, and $R^2$ and a are as defined above.

Method (B):

Alkylene oxide having 2 to 4 carbon atoms is polymerized with monohydric alcohol having 1 to 10 carbon atoms or an alkali metal salt thereof as an initiator, to obtain a polyoxyalkyleneglycol monoalkylether represented by the general formula:

(B₁)

wherein R" is an alkyl group having 1 to 10 carbon atoms, and $R^2$ and a are as defined above, having an ether bond at one terminal and a hydroxyl group at the other terminal. Subsequently, the hydroxyl group of the polyoxyalkyleneglycol monoalkylether is etherified or esterified, to obtain a polyoxyalkyleneglycol derivative represented by the general formula:

(B₂)

wherein $R^2$, R, R" and a are as defined above.)

Method (C):

Alkyleneoxide having 2 to 4 carbon atoms is polymerized with polyhydric alcohol having 2 to 6 valencies, and having 1 to 10 carbon atoms or alkali metal salt thereof as an initiator, to obtain a polyoxyalkyleneglycol derivative having a hydroxyl group at one terminal, represented by the general formula:

(C₁)

wherein R''' is an aliphatic hydrocarbon group having 1 to 10 carbon atoms and 2 to 6 valencies, c is an integer of 2 to 6, and b is a number, for which the mean value of b×c is 6 to 80, and $R^2$ is as defined above. Subsequently, the hydroxyl group of the resulting polyoxyalkyleneglycol derivative is etherified or esterified, to obtain a polyoxyalkyleneglycol derivative represented by the general formula:

(C₂)

wherein $R^2$, R, R''', b and c are as defined above.

In these methods of production, in order to esterify the hydroxyl group of the polyoxyalkyleneglycol having a hydroxyl group at its terminal or derivatives thereof, usually performed are a method to react said substances with an aliphatic carboxylic acid having 1 to 10 carbon atoms or reactive derivatives such as acid anhydride, acid halide and ester thereof, or a method to convert the hydroxyl group of the said polyoxyalkyleneglycol or derivatives thereof to sulfonates or halides, which are reacted with said carboxylic acid or salt thereof.

Examples of said carboxylic acid are formic acid, acetic acid, propionic acid, butyric acid, valeric acid, caproic acid, caprylic acid, capric acid, cyclohexanecarboxylic acid and the like.

When esterification is effected by the use of said carboxylic acid or acid anhydride thereof or by transesterification using the ester of said carboxylic acid, acid catalysts such as sulfuric acid and p-toluene sulfonic acid are usually used. When esterification is effected with the use of acid halides, usually amines are used as the dehydrohalogenating agent.

On the other hand in order to etherify the hydroxyl group of polyoxyalkyleneglycol having a hydroxyl group at its terminal or derivatives thereof, usually performed are a method to react them with alkali metals such as metallic sodium or alkali metal salts of lower alcohol such as sodium methoxide, to obtain alkali metal salt of said polyoxyalkyleneglycol or derivative thereof, and then react alkyl halide having 1 to 10 carbon atoms or sulfonates, or a method to transform the hydroxyl group of said polyoxyalkyleneglycol or a derivative thereof to sulfonate or halide, and then react them with aliphatic alcohol having 1 to 10 carbon atoms or alkali metal salts thereof.

In the polyoxyalkyleneglycol derivative thus obtained, the bonding style of the oxyalkylene unit is usually a head-tail bond in case of oxypropylene unit or oxybutylene unit, but head-head bonds and tail-tail bonds are also contained in some cases.

Lubricating Oil I of the present invention comprises, as the main component, the polyoxyalkyleneglycol derivative thus obtained and represented by the general formula (I), and said polyoxyalkyleneglycol derivative may be used solely or two or more kinds of them may be used in combination. Said lubricating oil can be favorably used even if it contains, in addition to the before-mentioned polyoxyalkyleneglycol derivative represented by the aforementioned general formula (I), a polyoxyalkyleneglycol derivative having hydroxyl group(s) at its terminals as long as the content of said hydroxyl groups is not more than 30 mol % of the total terminal groups.

The object of the present invention cannot be attained with polyoxyalkyleneglycol derivative wherein $R^1$ and $R^3$ are aromatic groups in the before-mentioned general formula (I), though the reason for this is not clear.

Preferred are the polyoxyalkyleneglycol derivatives of the general formula (I) wherein n is 1, and $R^1$ and $R^3$ are methyl groups.

The reasons for this preference is that (1) polyoxyalkylene derivatives having a hydroxy group at the terminal of the molecule (one terminal or both terminals) might cause the blocking of the expansion bulbs by icing since the derivatives dissolve a relatively large amount of water therein. (2) Accordingly, compounds having alkyl groups at both terminals are preferred since they are free from blocking of expansion bulbs as heretofore described, among all compounds, those having methyl groups at both terminals are most preferred. The derivatives have a highly favorable compatibility with the refrigerant R-134a.

Lubricating Oil I of the present invention is preferred to have a viscosity at 100° C. in the range of 2 to 50 cSt, more preferably 5 to 30 cSt, much more preferably 6 cSt (n=1, m=12 in the general formula (I)) to 30 cSt, still more preferably 7 cSt (n=1, m=14) to 30 cSt, and most preferably 9 cSt (n=1, m=19) to 30 cSt in order to retain the thickness of oil film necessary for lubricating and to maintain sufficient sealing properties. If necessary, to lubricating Oil I of the present invention can be added, various additives used in conventional lubricating oils such as anti-load additives, chlorine capturing agents, antioxidants, metal deactivating agents, defoaming agents, detergent dispersants, viscosity index improvers, oilness agents; antiwear additives, extreme pressure agents, rust inhibitors, anti-corrosion agents, pour point depressants and the like.

The above-mentioned anti-load additives include organic sulfide-based additives such as monosulfides, polysulfides, sulfoxides, sulfones, thiosulfinates, sulfurized fats and oils, thiocarbonates, thiophenes, thiazols, methanesulfonic acid esters; phosphate-based additives such as phosphoric monoesters, phosphoric diesters and phosphoric triesters (tricresyl phosphate); phosphite-based additives such as phosphorous monoesters, phosphorous diesters, and phosphorous triesters; thiophosphate-based additives such as thiophosphoric acid triesters; fatty acid-based additives such as higher fatty acid, hydroxyaryl fatty acids, carboxylic acid-containing polyhydric alcohol esters, and metal soap; fatty acid ester-based additives such as polyhydric alcohol esters and acrylic acid esters; organic chlorine-based additives such as chlorinated hydrocarbons and chlorinated carboxylic acid derivatives; organic fluorine-based additives such as fluorinated aliphatic acids, ethylene fluoride resins, fluoroalkyl polysiloxanes and fluorinated graphite; alcohol-based additives such as higher alcohols; and metallic compound-based additives such as naphthenates (lead naphthenate), fatty acid salts (fatty acid lead), thiophosphates (zinc dialkyldithiophosphate), thiocarbamates, organomolybdenum compounds, organic tin compounds, organo-germanium compounds, and boric acid esters.

Chlorine capturing agents include compounds having glycidyl ether group, epoxyfatty acid monoesters, epoxy fats and oils and compounds having an epoxycycloalkyl group. Antioxidants include phenols (2,6-di-tert-butyl-cresol), aromatic amines (alpha-naphthylamine) and the like. Metal deactivators include benzotriazole derivatives. Defoaming agents include silicone oil (dimethylpolysiloxane), and polymethacrylates. Detergent dispersants include sulfonates, phenates, succinimides and the like.

Viscosity index improvers include polymethacrylate, polyisobutylene, ethylene-propylene copolymer, hydrogenated styrene-diene copolymer and the like.

Lubricating Oil I of the present invention having a high compatibility with refrigerants as well as excellent lubricating ability is used for compression-type refrigerators, and it is particularly suitable for compression-type refrigerators employing R-134a as the refrigerant, since said lubricating oil has a good compatibility with R-134a, unlike the conventional lubricating oils. Moreover, Lubricating oil I can be used in mixture with another lubricating oil for compression-type refrigerators, with the purpose of improving its compatibility with refrigerants.

The description of the aforesaid Lubricating Oil II is as follows. This Lubricating Oil II contains a polyoxyalkyleneglycol derivative represented by the general formula (II) as aforementioned as a main component. Here in the formula, $R^4$ is an alkyl group having 1 to 3 carbon atoms, $R^5$ is an alkylene group having 2 to 4 carbon atoms and k is a number of 6 to 80, preferably 10 to 40.

The alkyl group of this lubricating oil is any of a methyl group, an ethyl group, a propyl group or an isopropyl group. If this alkyl group has 4 or more carbon atoms, compatibility with a hydrogen-containing fluorocarbon compound such as R-134a, etc. is reduced and phase separation comes to occur. of these alkyl groups, a methyl group is particularly preferred.

$R^5$ in the aforesaid general formula (II) is an alkylene group having 2 to 4 carbon atoms as heretofore described. Consequently, oxyalkylene groups having a repeating unit represented by $OR^5$ include an oxyethylene group, an oxypropylene group and an oxybutylene group. oxyalkylene groups in one molecule may be the same or two or more kinds of oxyalkylene groups may be contained in one molecule. However, it is preferred to contain at least one oxypropylene unit in one molecule. An alkylene group in an oxyalkylene group may be a straight-chain group or branched group.

The k in the general formula (II) is a number of 6 to 80 on the average, preferably 10 to 40. If this average value is too small, lubrication is reduced, and if it is too large, solubility decreases, so the objects of the present invention cannot be satisfactorily attained.

The polyoxyalkyleneglycol derivative, which is represented by the aforesaid general formula (II), to be used as the lubricating oil of the present invention, can be produced, for example, by the following methods.

Method (D):

Polyoxyalkyleneglycol having hydroxyl groups at both terminals represented by the general formula:

wherein $R^5$ and k are the same as the foregoing is obtained by polymerizing alkylene oxide having 2 to 4 carbon atoms such as ethylene oxide and propylene oxide, and water or alkali hydroxide as an initiator and then a polyoxyalkyleneglycol derivative represented by the general formula:

wherein $R^4$, $R^5$ and k are the same as the foregoing is obtained by etherifying one of the hydroxyl groups.

The etherification can be carried out by various methods, for example, the reaction of polyoxyalkyleneglycol with dialkyl sulfate, the reaction of alkoxide in polyoxyalkylene glycol with alkyl halide or the reaction of halogenated polyoxyalkyleneglycol wherein one terminal hydroxy group is halogenated, with alkoxide, and the others.

The reaction of polyoxyalkyleneglycol with dialkyl sulfate is usually carried out in the presence of an aqueous alkali solution at a temperature of −10° C. to 100° C. for 5 minutes to 50 hours. When the reaction is carried out at a temperature of more than 40° C., one of two alkyl groups contained in alkyl sulfate reacts, and at a temperature of more than 50° C., both alkyl groups react. If necessary, an inert liquid can be used as a solvent. Dialkyl sulfates include dimethyl sulfate, diethyl sulfate, dipropyl sulfate and diisopropyl sulfate. Aqueous alkalis include sodium hydroxide, potassium hydroxide and the like.

The reaction of alkoxide in polyoxyalkyleneglycol with halogenated alkyl is usually carried out at atmospheric pressure or under pressure at a temperature of 50° C. to 150° C. for 30 minutes to 30 hours. Solvents such as toluene, tetrahydrofuran and the like can be used preferably. Halogenated alkyls include methyl chloride, methyl bromide, methyl iodide, ethyl chloride, propyl chloride, isopropyl chloride and the like.

The method in which one terminal hydroxyl group of polyoxyalkyleneglycol is reacted with alkoxide after halogenating is that derivative in which hydroxy group at the terminal is halogenated, obtained by reacting polyoxyalkylene glycol with halogenating reagents such as thionyl chloride, phosphorus pentachloride, phosphorus pentabromide and the like is reacted with alkoxide at a temperature of 50° C. to 150° C. for 30 minutes to 30 hours. Alkoxides include sodium methoxide, potassium methoxide, sodium ethoxide, sodium propoxide, sodium isopropoxide and the like.

In the above Method (D), besides a polyoxyalkyleneglycol derivative wherein one terminal of polyoxyalkyleneglycol is alkylether and the other terminal thereof is a hydroxyl group, a polyoxyalkyleneglycol derivative and a polyoxyalkylene glycol material both terminals of which are alkylethers are included. Polyoxyalkyleneglycol with alkylether at one of the terminals can be separated to be used. Also, it can be used as a mixture without separating these components.

Method (E):

A polyoxyalkyleneglycol derivative represented by the general formula:

wherein $R^4$, $R^{15}$ and k are the same as the foregoing is obtained by polymerizing alkylene oxide having 2 to 4 carbon atoms and monohydric alcohol having 1 to 3 carbon atoms or its alkali metal salt as an initiator.

When alcohol is used as a material, aqueous alkali of 0.05 to 1.3 equivalent to alcohol is used. Alcohol, and aqueous alkali or alkali metal salt of alcohol are introduced in an autoclave and heated to a temperature of 50° C. to 150° C. The prescribed amount of alkylene oxide is introduced therein under pressure for 10 minutes to 50 hours while stirring to obtain the desired polyoxyalkyleneglycol derivative. Monohydric alcohols include methanol, ethanol, propanol and isopropanol. Alkali metal salts of monohydric alcohol include sodium methoxide, potassium methoxide, sodium ethoxide, sodium isopropoxide and the like.

In the above Method (E), only a polyoxyalkyleneglycol derivative with alkylether at one terminal of the polyoxyalkyleneglycol and a hydroxyl group at the other terminal thereof, is obtained. Therefore, Method (E) is preferable to Method (D) as the case may be.

A polyoxyalkyleneglycol derivative thus obtained may be used alone or in a mixture comprising two or more thereof.

The viscosity of Lubricating Oil II at 100° C. is preferably in the range of 2 to 50 cSt in order to maintain a thickness of oil film sufficient to lubricate.

To Lubricating Oil II of the present invention, in the same way as in the above Lubricating Oil I, various additives used in conventional lubricating oils can be added, if desired, for example, an anti-load additive, a chlorine capturing agent, an antioxidant, a metal deactivator, a defoaming agent, a detergent dispersant, a viscosity index improver, an oiliness agent, an anti-wear additive, an extreme pressure agent, a rust preventative, a corrosion inhibitor, a pour point depressant and the like. Specific examples thereof are the same as described before.

Subsequently, the detailed description of Lubricating Oil III in the present invention is as follows.

Lubricating Oil III contains a polyoxyalkyleneglycol derivative comprising an ethylene oxide-propylene oxide copolymer represented by the aforesaid general formula (III) and/or (IV) as a main component. $R^6$, $R^7$, $R^8$, $R^9$ and $R^{10}$ indicate each a hydrogen or an alkyl group having 1 to 3 carbon atoms (a methyl group, an ethyl group, an n-propyl group, an i-propyl group). Particularly, both $R^6$ and $R^7$, or $R^8$, $R^9$, and $R^{10}$ are preferably all alkyl groups, preferably methyl groups. A is a copolymer chain of p-times of ethylene oxide unit and q-times of propylene oxide unit and the form of the copolymer may be any of block copolymers, random copolymers, alternating copolymers and so on. p and q satisfy the following requirements: $0.1 \leq p/q \leq 10$, preferably $0.1 \leq p/q \leq 3$, most preferably $0.2 \leq p/q \leq 2$, and also $5 \leq p+q \leq 100$, preferably $5 \leq p+q \leq 50$. In this way, a polyoxyalkyleneglycol derivative of the general formula (III) and/or (IV) to be used in Lubricating Oil III of the present invention must contain an ethylene oxide unit and a propylene oxide unit in the specified proportion. If p/q is less than 0.1, there may occur the problems that a viscosity index decreases and solubility also is reduced. If it exceeds 10, there are troubles that the product becomes a wax state and solubility lowers. Further, if p+q is less than 5, there is a problem that lubricity decreases because the viscosity is too small. If it exceeds 100, solubility and heat exchange efficiency decrease undesirably.

Hereinafter, an ethylene oxide unit is referred to as EO, a propylene oxide unit is referred to as PO and A is referred to as $-(EO)_m-(PO)_n$ to make understanding of the invention simple. These are not limited in a block copolymer but widely applied to a random copolymer, an alternating copolymer and the like.

Specific examples of a polyoxyalkyleneglycol derivative of the general formula (III) or (IV) to be used in the present invention are:

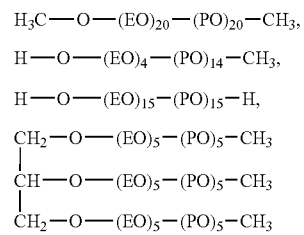

The above repeating unit numbers of EO and Po are shown only as examples, and they can not be limited so far as the aforesaid conditions are satisfied.

In Lubricating Oil III of the present invention, a polyoxyalkyleneglycol derivative of the above general formula (III) or (IV) may be used alone or in a mixture comprising two or more thereof.

Lubricating Oil III of the present invention contains the above polyoxyalkyleneglycol derivative as a main component. In the same way as in the aforesaid Lubricating Oil I, various additives used in conventional lubricating oils, for example, an anti-load additive, a chlorine capturing agent, an antioxidant, a metal deactivator, a defoaming agent, a detergent dispersant, a viscosity index improver, an oiliness agent, an anti-wear agent, an extreme pressure agent, a rust preventative, a corrosion inhibitor, a pour point depressant and the like, and further, a mineral oil and a synthetic oil used as a base oil for a lubricating oil, can be added thereto, if desired. Specific examples thereof are the same as aforementioned.

Further, the description of Lubricating Oil IV in the present invention is as follows.

Lubricating Oil IV of the present invention contains a polyoxyalkyleneglycol derivative represented by the aforesaid general formula (V) and/or (VI) as a main component. $R^{11}$, $R^{12}$, $R^{13}$, $R^{14}$ and $R^{15}$ indicate each a hydrogen or an alkyl group having 1 to 3 carbon atoms (a methyl group, an ethyl group, an n-propyl group, an iso-propyl group). Particularly, $R^{11}$ to $R^{15}$ are preferably all alkyl groups, most preferably methyl groups. $A^1$ to $A^3$ are (co)polymer chains comprising 3 to 100 preferably 3 to 50 of one, two or more kinds of alkylene oxide units having 2 to 4 carbon atoms. The numbers 3 to 100 representing the above unit number indicate the mean value of polymerization numbers of an alkylene oxide unit (an ethylene oxide-unit, a propylene oxide unit, a butylene oxide unit) and real numbers containing integers. That is, they are block copolymer chains, random copolymer chains or alternating copolymer chains containing d-times alkylene oxide units represented by the general formula:

$$—(R^dO)—$$

wherein $R^d$ is an alkylene group having 2 to 4 carbon atoms and e-times of alkylene oxide unit represented by the general formula:

$$—(R^eO)—$$

wherein $R^e$ is an alkylene group having 2 to 4 carbon atoms, and d and e are each 0 to 100 satisfying the requirement d +e =3 to 100. When either d or e is 0, they become homopolymer chains of the other alkylene oxide unit.

If d+e exceeds 100, compatibility decreases to separate undesirably.

Specific examples of a polyoxyalkyleneglycol derivative represented by the general formula (V) or (VI) to be used in the present invention are:

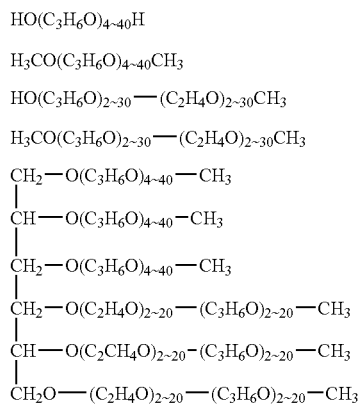

Copolymers referred to as the above block copolymerization contains not only block copolymers but also random copolymers or alternating copolymers.

In Lubrication Oil IV of the present invention, a polyoxyalkyleneglycol derivative of the above formula (VI) or (VII) may be used alone or in a mixture comprising two or more of both types.

In the present invention, phosphate represented by the aforesaid formula (V) is blended with a base oil containing a polyoxyalkyleneglycol derivative as a main component as described above. $R^{16}$ as well as the aforesaid $R^{11}$ to $R^{15}$ indicates hydrogen or an alkyl group having 1 to 3 carbon atoms and r indicates an integer of 1 or 2. If two $R^{16}$s are present, they may indicate different alkyl groups, but the total of carbon atoms in them must be 3 or less.

Specific examples of such phosphate represented by the general formula (V) are tricresol phosphate (TCP), triphenyl phosphate, tri-isopropylphenyl phosphate and so on. Of these, it is preferable to use tricresol phosphate.

In the present invention, the amount of the above phosphate to be blended is usually determined appropriately within the range of 0.1 to 5% by weight, preferably 0.2 to 3% by weight based on the total amount of a refrigerating machine oil to be prepared.

In Lubricating Oil IV of the present invention, by combining a polyoxyalkyleneglycol derivative having the aforesaid structure and the above phosphate, the effect of the phosphate as an anti-wear agent shows sufficiently and also the anti-seizure property improves, bad influences such as deterioration of appearance and lowering of high critical dissolution temperature decrease and, lubricity as a refrigerating machine oil improves.

Lubricating Oil IV of the present invention usually contains the above polyoxyalkyleneglycol derivative as a main component, whereto phosphate of the general formula (V) is blended. In addition, various additives used in conventional lubricating oils, for example, an anti-load additive, a chlorine capturing agent, an antioxidant, a metal deactivator, a defoaming agent, a detergent dispersant, a viscosity index improver, an oiliness agent, an anti-wear additive, an extreme pressure agent, a rust preventative, a corrosion inhibitor, a pour point depressant and the like can be blended.

And further, as a base oil besides the above polyoxyalkyleneglycol derivative, a mineral oil and a synthetic oil used as a base oil for a lubricating oil can be added thereto, if desired. Specific examples thereof are the same as described before.

Further, the description of Lubricating Oil V in the present invention is as follows.

This Lubricating Oil V is a compound obtained by adding alkylene oxide to glycerol, as shown in the general formula (VIII), wherein $R^{17}$, $R^{18}$ and $R^{19}$ may be the same alkylene groups or different alkylene groups.

Alkylene oxide added in the polyoxyalkyleneglycol derivative to be used in the present invention, having 2 to 6 carbon atoms, such as ethylene oxide, propylene oxide, butylene oxide and the like can be used.

In the formula, additional numbers s, t and u are integers of 1 to 30, preferably 2 to 15.

The polyoxyalkyleneglycol derivative of the general formula (VIII) can be used as a mixture having the different additional number of moles.

The viscosity of the polyoxyalkyleneglycol derivative depends on the type of an alkylene group and the additional number of moles (s, t, u).

A polyglycol compound to be used in the present invention needs to have a viscosity of 50 to 250 cSt, preferably 60 to 200 cSt at 40° C. If the viscosity is less than 50 cSt, the sealing property becomes inferior, and if it exceeds 250 cSt, the polyoxyalkyleneglycol derivative becomes insoluble in a refrigerant.

According to the desired viscosity, the type and the average additional number of moles can be determined.

Such polyoxyalkyleneglycol derivative obtained by adding propylene oxide or ethylene oxide to glycerol can be preferably used.

For example, a propylene oxide adduct of glycerol represented by the formula:

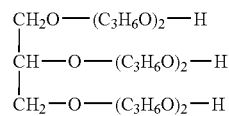

has a viscosity of 116 cSt at 40° C. A propylene oxide adduct of glycerol represented by the formula:

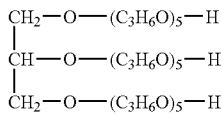

has a viscosity of 103 cSt at 40 C. Both can be preferably used.

It is preferred that the purity of the polyoxyalkyleneglycol derivative to be used in the present invention is 70% or more by weight.

In Lubricating Oil V of the present invention, a mineral oil or a synthetic oil can be blended to the above polyglycol compound to the amount of 50% or less by weight.

A mineral oil or a synthetic oil having a viscosity of 5 to 500 cSt at 40° C. can be preferably blended. For example, (i) a paraffinic mineral oil, (ii) a naphthenic mineral oil, (iii) poly (Y-olefin, (iv) alkylbenzene, (v) alkyldiphenyl, (vi) ester (hindered ester, dibasic acid ester, polyolester, phosphate), (vii) polyglycol (polyphenyleneglycol, monofunctional- and difunctional-polyglycol) and the like can be used. Of these, synthetic oils (iv) to (vii) having high solubility in a refrigerant can be most preferably blended. If the viscosity of these mixed oils becomes less than 5 cSt, the amount of oil by circulation increases, losses due to evaporation become large and a disadvantage of poor sealing property occurs.

In Lubricating Oil V, it is preferred to maintain the water content at 500 ppm or less, preferably 300 ppm or less, more preferably 200 ppm or less and most preferably 100 ppm or less.

If the water content increases, rust is liable to form and further, solubility decreases. Though Lubricating Oil V is excellent in various properties as described above, it is relatively inferior in wear resistance to other Lubricating Oils, Lubricating Oils I to IV and VI.

In Lubricating Oil V of the present invention, additives to be added usually, for example, an anti-wear agent, an antioxidant, a metal deactivator, a chlorine capturing agent a defoaming agent and the others can be added appropriately, if desired.

Next, Lubricating Oil VI of the present invention will be explained. In said Lubricating Oil VI, polyoxyalkyleneglycol derivative used as component (a) is not critical, but it is preferred to use at least one compound selected from a compound represented by the general formula:

  (IX)

wherein $R^{20}$ and $R^{22}$ are each a hydrogen, a hydrocarbon group or an acyl group, and may be identical or different from each other, $R^{21}$ is an alkylene group having 2 to 6 carbon atoms, and w is a number of 2 or more and a compound represented by the general formula:

  (X)

wherein $R^{23}$, $R^{24}$ and $R^{25}$ are each an alkylene group having 2 to 6 carbon atoms, which may be identical or different from each other, $R^{26}$, $R^{27}$ and $R^{28}$ are each a hydrogen atom, a hydrocarbon group or an acyl group, which may be identical or different from each other, and x, y and z are each a number of 2 or more, which may be identical or different from each other.

$R^{20}$ and $R^{22}$ in the general formula (IX), $R^{26}$, $R^{27}$ and $R^{28}$ in the general formula (X) are each a hydrogen atom, a hydrocarbon group or an acyl group, and said hydrocarbon groups include an alkyl group, a cycloalkyl group or an aryl group each having 1 to 30, preferably 1 to 12 carbon atoms. Examples of such hydrocarbon groups are a methyl group, an ethyl group, an n-propyl group, an isopropyl group, various butyl groups, various pentyl groups, various hexyl group, various heptyl groups, various octyl groups, various nonyl groups, various decyl groups, various undecyl groups, various dodecyl groups, various cyclopentyl groups, a cyclohexyl group, a methylcyclohexyl group, a phenyl group, a tolyl group, a benzyl group, a phenethyl group and the like.

Acyl groups includes those groups derived from aliphatic carboxylic acids, alicyclic compounds, or aromatic carboxylic acids each having 1 to 30, preferably 1 to 12 carbon atoms. Examples of such acyl groups are those derived from carboxylic acids including formic acid, acetic acid, propionic acid, butyric acid, valeric acid, caproic acid, caprylic acid, lauric acid, cyclohexane carboxylic acid, and benzoic acid.

$R^{21}$ in the general formula (IX), $R^{23}$, $R^{24}$ and $R^{25}$ in the general formula (X) are each an alkylene group having 2 to 6 carbon atoms, preferably an ethylene group, a propylene group, or a butylene group. In polyoxyalkyleneglycol derivative represented by the general formulas (IX) and (X), the oxyalkylene group as the repeating unit contained in one molecule may be identical or different.

$R^{20}$ and $R^{22}$ in the general formula (IX) may be identical or different from each other, but preferably either of them is a hydrocarbon group, more preferably an alkyl group. Specific examples of the polyglycol compounds represented by said general formula (IX) are,

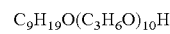

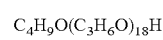

$R^{23}$, $R^{24}$ and $R^{25}$ in the general formula (X) may be identical or different from each other. $R^{26}$, $R^{27}$ and $R^{28}$ may be identical or different from each other, but preferably all of them are hydrogen atoms. Furthermore, x, y and z may be identical or different from one another. A specific example of such a compound is:

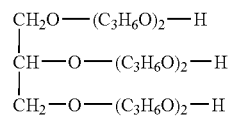

Polyoxyalkyleneglycol derivative represented by the general formula (IX) or (X) can be produced according to a conventional process. For example, in a process for producing the polyoxyalkyleneglycol derivative represented by the general formula (IX), an alkyleneoxide having 2 to 6 carbon atoms such as ethyleneoxide or propyleneoxide is polymerized with water or alkali hydroxide as an initiator, to obtain a polyglycol having hydroxyl groups at both terminals, and if one of or both the hydroxyl groups of the polyglycol thus obtained is/are etherified or esterified according to conventional processes, polyoxyalkyleneglycol derivatives having ether bond or ester bond at terminals can be obtained.

Further, if alkyleneoxide having 2 to 6 carbon atoms is polymerized with the use of alcohols having the desired carbon number or phenols or alkali metal salts thereof as an initiator, polyoxyalkyleneglycol derivatives having an ether bond at one terminal and a hydroxyl group at the other terminal can be obtained. And if the hydroxyl groups of said derivative are etherified or esterified, a polyoxyalkyleneglycol derivative having ether bonds or ether bond and ester bond at both the terminals can be obtained.

In a process for producing polyoxyalkyleneglycol derivatives represented by the general formula (X), if an alkyleneoxide having 2 to 6 carbon atoms is polymerized with the use of glycerol or alkali metal salts thereof as an initiator, a polyglycolether of glycerol having three hydroxyl groups at the terminals can be obtained, and if the hydroxyl groups of the said polyglycolether are etherified or esterified according to a conventional process, a polyglycol ether (polyoxyalkyleneglycol derivative) of glycerol having ether bonds or ester bonds at the terminals can be obtained.

In Lubricating Oil VI in the present invention, one of the above-mentioned component (a) may be used solely, or two or more kinds may be used in combination.

In Lubricating Oil VI of the present invention, at least one compound selected from the group consisting of (i) dibasic acid ester, (ii) fluorinated oil (iii) polyhydric alcohol ester, and (iv) fluorosilicone is used as component (b).

As the dibasic acid ester of component (i), for example, a compound represented by the general formula:

$$R^{29}OOC-A^4-COOR^{30} \quad (XI)$$

wherein $R^{29}$ and $R^{30}$ are each an alkyl group, a cycloalkyl group or an aryl group each having 1 to 20 carbon atoms and may be identical or different from each other, and $A^4$ is an alkylene group, a cycloalkylene group or a phenylene group, is used. Typical examples of such dibasic acid esters are di-2-ethylhexyl adipate, di-2-ethylhexyl sebacate, cyclohexane-1,4-dicarboxylic acid di-2-ethylhexyl, diisodecyl phthalate and the like.

A preferred example of the fluorinated oil as component (ii) is monochlorotrifluoroethylene polymer represented by the general formula:

wherein X and X are each a halogen atom, and may be identical or different from each other, and j is a number, for which average molecular weight is 250 to 1500. As the said monochlorotrifluoroethylene polymer, Daifloil 10 and Daifloil 20 (Trade Mark, both produced by Daikin Industry Co., Ltd.) are commercially distributed.

Preferable examples of polyalcoholester as component (iii) are monovalent or divalent aliphatic esters of polyhydric alcohols such as neopentyl glycol, glycerol, trimethylol ethane, trimethylol propane, pentaerithritol, and sorbitol.

Typical examples of such polyhydric alcohol esters are trimethylol propane caproic acid ester, pentaerithritol propionic acid ester, pentaerithritol caproic acid ester, trimethylol prouane adipic acid ester and the like.

An Example of fluorosilicone as component (iv) is a compound represented by the general formula:

wherein at least one of $R^{31}$, $R^{32}$, $R^{33}$ $R^{34}$ $R^{35}$ and $R^{36}$ is a fluorohydrocarbon group having 1 to 30 carbon atoms, and others are hydrocarbon groups, acyl groups, alkoxyl groups or fluorohydrocarbon groups each having 1 to 30 carbon atoms, and may be identical of different from one another, and v is 0 or an integer of 1 or more.

The hydrocarbon group in the fluorosilicone represented by the general formula (XIII) is an alkyl group, a cycloalkyl group or an aryl group, and in the fluorohydrocarbon group, at least one hydrogen atom of these hydrocarbon groups is substituted by a fluorine atom.

Further, in said alkoxyl group and acyl group, when oxygen atom or carbonyl group is removed, the residues comprise an alkyl group, a cycloalkyl group or an aryl group. Typical example of such a fluorosilicone is LS-8210 (Trade Mark, produced by Shin-etsu Chemical Industry Co., Ltd.), which is commercially available.

In Lubricating Oil VI of the present invention, at least one compound selected from the group consisting of component (i), component (ii), component (iii) and component (iv) is compounded as component (b) with component (a). The amount of said component (b) is defined usually in the range of 0.01 to 50% by weight, particularly in the range of 0.1 to 30% by weight of the total amount of component (a) and component (b). If the amount is less than 0.01% by weight, the effect of improving solubility at high temperatures to fluoroalkanes as refrigerant is not shown sufficiently, and if it is in excess of 50% by weight, stability or blend stability will be reduced.

Lubricating Oil VI of the present invention can be added with various additives which are conventionally used for refrigerator oils, as long as the object of the present invention might not be hindered. Examples of such additives are anti-wear agents, antioxidants, metal deactivators, chlorine capturing agents, defoaming-agents, pour point depressants, viscosity index improvers and the like.

The lubricating oils of the present invention are excellent in compatibility with refrigerants and in lubricating property, and accordingly utilized as lubricating oils for various refrigerating machines using fluoroalkane (flon) refrigerant, including a compression-type refrigerators. Particularly, unlike the conventional lubricating oils, the lubricating oil in the present invention has good compatibility with hydrogen-containing fluorocarbon compounds (hydrogen-containing fluoroalkane) such as R-134a and the like, for example, 1,1, 2,2tetrafluoroethane (R-134), 1,1-dichloro-2,2,2trifluoroethane (R-123), 1-chloro-1,1-difluoroethane (R-142b), 1,1-difluoroethane (R-152a), chlorodifluoromethane (R-22), trifluoromethane (R-23). This solubility is satisfactory throughout the whole temperature range.

Consequently, the lubricating oil in the present invention can be expected to be effectively used as a lubricating oil for refrigerators using various hydrogen-containing fluorocarbon compounds as a refrigerant, a cooler (particularly car air-conditioner), a heat pump and the like. Also, this lubricating oil can be used by mixing with other lubricating oils for compression-type refrigerators.

An explanation of the Lubricant Oil VII which polyoxyalkyleneglycol derivative represented by the general formula (XIV) is as follows:

Herein $R^{40}$ is an unsaturated hydrocarbon group having 2 to 10 carbon atoms excluding aromatic unsaturated hydrocarbons, such as an alkenyl group, an alkynyl group, a cycloakenyl group, more specifically a vinyl group, an allyl group, an isopropenyl group, a butenyl group, ethynyl group, propynyl group and butynyl group.

$R^{41}$ is as described before, a hydrogen, an alkyl group having 1 to 20 carbon atoms (including a methyl group, an ethyl group, a propyl group, and butyl group), an alkenyl group having 2 to 20 carbon atoms (including a vinyl group, an allyl group, and a butenyl group), an alkynyl group having 2 to 20 carbon atoms (including an ethynyl group, and propynyl group), an aryl group having 6 to 20 carbon atoms (including a phenyl group, a tolyl group, a xylyl group, a nonylphenyl group, and a dodecylphenyl group, an aralkyl group having 7 to 20 carbon atoms (including a benzyl group and a phenethyl group) or a cycloalkyl group having 4 to 20 carbon atoms (including a cyclohexyl group, a cycloheptyl group, a methylcyclohexyl group, and a nonylcyclohexyl group). Among them, preferred are a hydrogen, an alkyl group having 1 to 4 carbon atoms and an alkenyl group having 2 to 4 carbon atoms.

A is a (co)polymerization chain consisting of 3 to 90-times, preferably 3 to 50-times alkyleneoxide units of one or plural kinds, having 2 to 4 carbon atoms. Therein, the numbers 3 to 90 representing the above unit number indicates the mean value of the polymerization degree of alkyleneoxide unit (an ethyleneoxide unit, a propyleneoxide unit, a butyleneoxide unit), showing real numbers including integers.

That is, A is a block copolymerization chain, a random copolymerization chain, or an alternating copolymerization chain containing a-times alkyleneoxide units represented by the general formula:

$$-(R^{42}O)-$$

wherein $R^{42}$ indicates an alkylene group having 2 to 4 carbon atoms and b-times alkyleneoxide units represented by the general formula:

$$-(R^{42'}-O)-$$

wherein $R^{42'}$ is an alkylene group having 2 to 4 carbon atoms, and a and b are each a number of 0 to 90, satisfying the requirement: a+b=3 to 90.

In case either of a and b is 0, the polymer chain becomes a homopolymerization of another alkyleneoxide unit.

Herein, if a+b exceeds 90, compatibility with a refrigerant decreases to cause two-layer separation undesirably.

Examples of polyoxyalkyleneglycol derivatives represented by the general formula (XIV) mentioned above are:

$$CH_2=CH-CH_2O(C_3H_6O)_{4-40}H$$

$$CH_2=CH-CH_2O(C_3H_6O)_{4-40}CH_3$$

$$CH_2=CH-CH_2O(C_3H_6O)4-40-CH_2CH=CH_2$$

$$CH_2=CH-CH_2O(C_3H_6O)_{2-20}-(C_2H_4O)_{2\,20-CH3}$$

$$CH_2CHO(C_3H_6O)_{4-40}H$$

$$CH_2=CHO(C_3H_6O)_{4-40}CH_2=CH_2$$

$$CH_2=CHO(C_3H_6O)_{4-40}CH_3$$

$$CH=CO(X_3H_6O)_{4-40}H$$

$$CH=CO(C_3H_6O)_{440}C=CH$$

(copolymers shown by the above block copolymerization includes not only block copolymers but also random copolymers or alternating copolymers.)

Lubricating oil VIII of the invention comprises components (A) and (B) as the main components, wherein component (A) is polyoxypropyleneglycol dimethylether having a kinematic viscosity of 2 to 50 cSt, preferably 5 to 30 cSt at 100° C., and specifically represented by the formula:

$$CH_3O(C_3H_6O)_mCH_3 \qquad XV$$

wherein m indicates the degree of polymerization and component (B) is a compound represented by the general formula:

$$CH_3O(C_2H_4I)_x(RO)_yCH_3$$

wherein R indicates a propylene group or butylene group, x and y indicate real numbers satisfying the requirements:

$$0.01<44x/M$$

in which M is the molecular weight of the compound represented by the above formula and $$5 \leq x+y \leq 100;$$

however, when x is a plural number, Rs may be identical to or different from each other, in such a ratio that the content of ethylene oxide unit ($C_2H_4O$) may be 1 to 30% by weight based on the total weight of (A) and (B).

In the above formula XV, both the terminals must be methyl groups. If either or both of the terminals are ethyl groups and the like, said lubricating oil becomes poor in compatibility with R-134a. However, polyoxypropyleneglycol monomethylether, polypropyleneglycol and the like can be contained, provided that it is in a small amount of 30% by weight or less based on the total amount of component (A).

Component (B) of Lubricating Oil VIII of the invention is, as described above, a compound represented by the general formula XVI:

$$CH_3O(C_2H_4O)_x(RO)_yCH_3 \qquad XVI.$$

Representative compounds are polyoxyethylene polyoxypropyleneglycol dimethylether, polyoxyethylene polyoxybutyleneglycol dimethylether, or polyoxyethylene polyoxypropylene polyoxybutyleneglycol dimethylether or mixtures thereof. In the general formula XVI, R indicates an oxypropylene group (or propylene oxide group) ($C_3H_6O$) or an oxybutylene group (or butylene oxide group) ($C_4H_8O$), or a mixture thereof; x and y are real numbers satisfying $0.01 \leq 44x/M$ (M is the molecular weight of the compound represented by the above formula XVI), and $5 \leq x+y \leq 100$. More specifically, x and y satisfy the requirements: $1 \leq x \leq 100$, $0 \leq y \leq 99$ and $0.1 \leq x/(x+y) \leq 1$. The most preferred x and y are those which satisfy the requirements: $10 \leq x+y \leq 50$ and $0.2 \leq x/(x+y) \leq 1$.

Satisfying the equation $0.01<44x/M$ means that the content of ethyleneoxide unit ($C_2H_4O$) exceeds 0.01 (ratio by weight) of the compound represented by the general formula XVI. If the value of 44x/M is 0.01 or lesser the content of the ethylene oxide unit in the mixture does not reach the prescribed value, to lead to an insufficient antiwear property.

Also in component (B), both the terminals of the molecule should be methyl groups (that means dimethylether) like component (A). If either one or both of the terminals are ethyl groups, propyl groups and the like, the compatibility with R-134a becomes low. In the general formula XVI, a block polymer is shown for convenience, but actually it is not limited to block polymer, but may be random polymer, alternating polymer or graft polymer. In other words, the ethyleneoxide group and propyleneoxide group or butyleneoxide group may be bonded in any of various forms.

In lubricating Oil VIII of the invention, the above mentioned component (B) is compounded so that the content of ethyleneoxide unit ($C_2H_4O$) may be 1 to 30% by weight, preferably 3 to 20% by weight of the total amount. If it is less than 1% by weight, the resulting oil becomes insufficient in antiwear property. If it is in excess of 30% by weight, troubles are caused in suitability to sealing materials, anti-peeling properties for coating material is lowered, and hygroscopicity increases undesirably. In addition, Lubricating Oil VIII loses its compatibility with fluorocarbon refrigerant containing no hydrogen such as R-12. Particularly, when the kinematic viscosity is high, the compatibility falls largely.

On the other hand, Lubricating Oil IX of the invention comprises main component (C) which is a compound having a kinematic viscosity at 100° C. of 2 to 50 cSt and is represented by the general formula XVII:

$$CH_3O(C_2H_4O)_z(RO)_wCH_3 \qquad XVII$$

wherein R indicates a propylene group or a butylene group, z and w are real numbers satisfying the requirements:

$$0.01 \leq 44z/M' \leq 0.3$$

in which M' is the molecular weight of the compound represented by the above formula and $$5 \leq z+w \leq 100.$$

However, when w is a plural number, Rs may be identical to or different from each other. The main component (C) preferably has a kinematic viscosity of 5 to 30 cSt at 100° C. Representative compounds represented by the general formula XVII include polyoxyethylene polyoxypropyleneglycol dimethylether, polyoxyethylene polyoxybutyleneglycol dimethylether, or polyoxyethylene polyoxypropylene polyoxybutyleneglycol dimethylether. Said component (C) is basically identical to the above-mentioned component (B), but the content of ethyleneoxide unit ($C_2H_4O$), that is, 44z/M, of component (C) must be 0.01 to 0.3, preferably 0.03 to 0.2.

In Lubricating Oil VIII of the invention, the proportion of the above-mentioned ethyleneoxide unit is controlled to be in the range of 1 to 30% by weight by compounding components (A) and (B), while in Lubricating Oil IX, the proportion of the ethyleneoxide unit is controlled in the prescribed range by the amount of the above-mentioned component (C).

Lubricating Oil VIII of the invention comprises the above-mentioned components (A) and (B) as the main components (or essential components), and Lubricating Oil IX comprises component (C) as the main component. Furthermore, various additives are used in the conventional lubricating oils, such as anti-load additives including extreme-pressure agents, antiwear agents, antioxidants, metal deactivating agents, defoaming agents, detergent dispersants, viscosity index improvers, rust inhibitors, anti-corrosion agents, pour point depressants, and further, mineral oils and synthetic oils to be used as the base oil for lubricating oils can be added, if necessary.

The present invention is described in greater detail with reference to the following examples.

PREPARATION EXAMPLE 1

In a 200-milliliter three-necked glass flask equipped with a stirrer and dropping funnel, 50 g of Unilube MB-11 (polyoxypropyleneglycol mono-n-butylether, average molecular weight: 1000) produced by Nippon Oil & Fats co., Ltd., 9.5 g (0.12 mol) of pyridine and 100 ml of ethyl ether were placed and then, 9.4 g (0.12 mol) of acetyl chloride was added through a dropping funnel over 30 minutes, while stirring at room temperature. After heating and refluxing for 2 hours, the reaction mixture was cooled to room temperature, was transferred into a separating funnel and was washed five times with 50 ml of saturated brine each time. After the ether was distilled away, the residue was dried at 100° C. for one hour at a reduced pressure with a vacuum pump to obtain 49.0 g of the desired acetate of Unilube MB-11.

PREPARATION EXAMPLE 2

In a 300-milliliter three-necked glass flask equipped with a stirrer and a distillation head, 75 g of Unilube MB-11 produced by Nippon Oil & Fats Co., Ltd., and 50 ml of toluene were placed, and 20 ml of toluene was distilled away to remove water content, while heating and stirring. Then the distillation head was taken off, a cooler and a dropping funnel were attached, and thereafter 11.9 g (0.15 mol) of pyridine and 50 ml of toluene were added. While stirred at room temperature, 16.0 g (0.15 mol) of n-butyryl chloride was added through a dropping funnel over 30 minutes. After heating and refluxing for 4 hours, the reaction mixture was cooled to room temperature, was poured into a separating funnel and was washed five times with 50 ml of saturated brine each time. After toluene was distilled away, the residue was dried at 100° C. for one hour at a reduced pressure with a vacuum pump to obtain 70.5 g of the desired n-butyric acid ester of Unilube MB-11.

PREPARATION EXAMPLE 3

The same procedure was repeated as in Preparation Example 2 except that 16.0 g (0.15 mol) of isobutyryl chloride was used in place of n-butyryl chloride to obtain 74 g of isobutyric acid ester of Unilube MB-11.

REFERENCE EXAMPLE 1

The same procedure was repeated as in Preparation Example 1 except that 16.9 g (0.12 mol) of benzoyl chloride was used in place of acetyl chloride to obtain 57.0 g of benzoate of Unilube MB-11.

REFERENCE EXAMPLE 2 in a 200-milliliter three-necked glass flask equipped with a stirrer and a dropping funnel, 50 g of Unilube MB-11 produced by Nippon oil & Fats Co., Ltd., 7.9 g (0.14 mol) of potassium hydroxide and 80 ml of toluene were placed, and then, 15.2 g mol) of benzyl chloride was added through a dropping funnel over 30 minutes, while heating and refluxing toluene and stirring. Then the mixture was heated and refluxed for 4 hours, cooled to room temperature, and the reaction mixture was poured into a separating funnel and was washed five times with 50 ml of saturated brine each time. After toluene was distilled away, the residue was dried at 100°

C. for one hour at a reduced pressure (0.1 MmHg) with a vacuum pump to obtain 49.0 g of the desired benzyl ether of Unilube MB-11.

PREPARATION EXAMPLE 4

In a 300-milliliter three-necked glass flask equipped with a stirrer and a distillation head, 65 g of polyoxypropyleneglycol mono-n-butylether (average molecular weight, 1120) and 70 ml of toluene were placed, and about 20 mi of toluene was distilled away to remove water content, while heating and stirring. After cooling, 25 g (0.13 mol) of methanol solution of sodium methoxide (28% by weight) was added and heated to distill away methanol and about 20 ml of toluene. After cooling, the distillation head was taken off, and a cooler and a dropping funnel were attached. Then 30 g (0.19 mol) of ethyl iodide was added through a dropping funnel over 30 minutes, while heating at 50° C. and stirring. After heating and stirring at 50° C. for one hour, at 70° C. for 3 hours and a 105° C. for 1.5 hours, the mixture was cooled to room temperature. Then, the reaction mixture was poured into a separating funnel and was washed five times with 50 ml of saturated brine each time. After toluene was distilled away, the residue was dried at 100° C. for one hour at a reduced pressure with a vacuum pump to obtain 58 g of the desired ethylether derivative of polyoxypropyleneglycol mono-n-butylether.

PREPARATION EXAMPLE 5

The same procedure was repeated, as in Preparation Example 4 except that 65 g of polyoxypropyleneglycol (average molecular weight: 1100) having a hydroxyl group at each of both terminals was used in place of polyoxypropyleneglycol mono-n-butylether, and 50 g (0.27-mol) of ethanol solution of sodium methoxide (28% by weight) and 60 g (0.38 mol) of ethyl iodide were used to obtain 62 g of the desired polyoxypropyleneglycol ether.

PREPARATION EXAMPLE 6

The same procedure was repeated as in Preparation Example 4 except that 65 g of polyoxypropyleneglycol (average molecular weight: 1000) derivative having three hydroxyl groups in a molecule obtained by polymerizing propylene oxide using a glycerol as an initiator in place of polyoxypropyleneglycol mono-n-butylether was used, and 50 g (0.26 mol) of methanol solution of sodium methoxide (28% by weight) and 90 g (0.58 mol) of ethyl iodide were used to obtain 61 g of the desired polyoxypropyleneglycol triethylether derivative.

PREPARATION EXAMPLE 7

In a 300-milliliter three-necked glass flask equipped with a stirrer and a distillation head, 50 g of Sannix PP-1000 (polyoxypropyleneglycol having a hydroxyl group at each of both terminals, average molecular weight: 1000) produced by Sanyo Chemical Industries, Ltd. and 80 ml of toluene were placed, about 20 ml of toluene was distilled away to remove water content, while heating and stirring.

After cooling, 25 g (0.13 mol) of methanol solution of sodium methoxide (28% by weight) was added, and the mixture was heated to distill away methanol and about 20 ml of toluene.

After cooling, the content was poured into a 300 milliliter stainless steel autoclave equipped with a stirrer, and 36.8 g (0.26 mol) of methyl iodide was added and sealed. Then, the mixture was heated at 50° C. to 70° C. over 4.5 hours and reacted at 85° C. for 4 hours. After cooling to room temperature, the reaction mixture was dissolved in the mixture of 100 ml of water and 200 ml of methanol, and was passed through a 200 ml column of cation-exchange resin, and then through a 200 ml column of anion-exchange resin.

After the solvent was distilled away, the residue was dried for one hour at a reduced pressure (0.1 MmHg) with a vacuum pump to obtain 42.5 g of the desired dimethyl ether derivative of Sannix PP-1000. In the derivative, the infrared absorption spectrum (3450 $cm^{-1}$) ascribable to a hydroxyl group was lost.

PREPARATION EXAMPLE 8

The same procedure was repeated as in Preparation Example 7 except that 60 g of Nissan Uniol D-1200 (polyoxypropyleneglycol having a hydroxyl group at each of both terminals, average molecular weight: 1200) produced by Nippon Oil & Fats Co., Ltd. was used in place of Sannix PP-1000 to obtain 49 g of dimethylether derivative of Nissan Uniol D-1200. In the derivative, the infrared absorption spectrum (3450 $cm^{-1}$) ascribable to a hydroxyl group was lost.

EXAMPLES 1 TO 8, COMPARATIVE EXAMPLES 1 TO 4

The compatibility with R-134a of the compounds obtained in Preparation Examples 1 to 8, Reference Examples 1 to 2, and polyglycol as the starting material of Preparation Examples 1 and 4 was measured.

A specified sample was added into a pressure glass ampule so that the amount of the sample would be 10% by weight or 20% by weight to R-134a (1,1,1,2-tetrafluoroethane), and this was jointed to a vacuum pipe and R-134a gas pipe. Afterwards, the ampule was subjected to vacuum degassing at a room temperature, and cooled with liquid nitrogen to take out the specified R-134a. Then, the ampule was sealed, heated from −40° C. in a thermostat and the starting temperature of phase separation was measured. The higher phase separation temperature is preferable. The results were shown in Table 1.

TABLE 1

| No. | Sample | From | Viscosity (cSt) 40° C. | 100° C. | Viscosity Index | Starting Temperature of Phase Separation (° C.) Ratio of polyglycol to 1,1,1,2-tetrafluoroethan (wt %) 10% | 20% |
|---|---|---|---|---|---|---|---|
| Example 1 | Acetate of Unilube MB-11 | Product of Preparation Example 1 | 48.23 | 9.77 | 194 | 71.0 | 74.0 |

TABLE 1-continued

| No. | Sample | From | Viscosity (cSt) 40° C. | Viscosity (cSt) 100° C. | Viscosity Index | Starting Temperature of Phase Separation (° C.) Ratio of polyglycol to 1,1,1,2-tetrafluoroethan (wt %) 10% | 20% |
|---|---|---|---|---|---|---|---|
| Example 2 | n-butyrate of Unilube MB-11 | Product of Preparation Example 2 | 46.72 | 9.96 | 207 | 66.5 | 66.5 |
| Example 3 | Isobutyrate of Unilube MB-11 | Product of Preparation Example 3 | 45.44 | 9.61 | 203 | 66.5 | 67.0 |
| Comparative Example 1 | Unilube MB-11 | Material of Preparation Example 1 | 56.10 | 10.8 | 187 | 51.5 | 54.0 |
| Comparative Example 2 | Benzoate of Unilube MB-11 | Product of Reference Example 1 | 72.03 | 12.58 | 175 | 15.0 | −3.0 |
| Comparative Example 3 | Benzyl ether of Unilube MB-11 | Product of Reference Example 2 | 49.35 | 9.90 | 192 | 32.0 | 28.5 |
| Example 4 | Ethylether derivative of monohydroxypolyoxypropyleneglycol | Product of Preparation Example 4 | 38.70 | 8.71 | 214 | 63.0 | 66.5 |
| Comparative Example 4 | Monohydroxypolyoxypropyleneglycol | Material of Preparation Example 4 | 53.0 | 10.06 | 180 | 55.5 | 57.5 |
| Example 5 | Ethylether derivative of dihydroxypolyoxypropyleneglycol | Product of Preparation Example 5 | 41.50 | 9.01 | 206 | 70.0 | 73.0 |
| Example 6 | Ethylether derivative of trihydroxypolyoxypropyleneglycol | Product of Preparation Example 6 | 40.76 | 8.10 | 177 | 73.0 | 74.5 |
| Example 7 | Methylether derivative of dihydroxypolyoxypropyleneglycol | Product of Preparation Example 7 | 32.0 | 7.50 | 214 | 79.5 | 80.5 |
| Example 8 | Methylether derivative of dihydroxypolyoxypropyleneglycol | Product of Preparation Example 8 | 47.56 | 9.70 | 195 | 70.5 | 70.5 |

PREPARATION EXAMPLE 9

In a 200-milliliter stainless steel autoclave equipped with a stirrer and a conduit, 3.0 g of powdery sodium methoxide was placed, sealed and heated at 105° C., and 100 g of propyleneoxide was introduced under pressure to the autoclave through a conduit over 9 hours, while stirring.

After 100 ml of water and 200 mi of methanol were added and dissolved in the reaction mixture, the solution was passed through a 200 ml column of cation-exchange resin, then through a 200 ml column of anion-exchange resin to remove sodium ion. After methanol and water were distilled away, the residue was dried at 100° C. for an hour at a reduced pressure (0.4 mmhg) with a vacuum pump to obtain 96 g of the desired polyoxypropyleneglycol monomethylether.

PREPARATION EXAMPLE 10

In a 200-milliliter stainless steel autoclave equipped with a stirrer and a conduit, 1.6 g of methanol and 0.2 g of sodium hydroxide were placed, sealed, heated at 105° C. and 129.6 g of propyleneoxide was introduced under pressure to the autoclave through a conduit over 9 hours.

After 100 ml of water and 200 ml of methanol were added and dissolved in the reaction mixture, the solution was passed through a 200 ml column of cation-exchange resin, then through a 200 ml column of anion-exchange resin to remove sodium ion. After methanol and water were distilled away, the residue was dried at 100° C. for one hour at a reduced pressure (0.4 mmHg) with a vacuum pump to obtain 115 g of the desired polyoxypropyleneglycol monomethylether.

PREPARATION EXAMPLE 11

The same procedure was repeated as in Preparation Example 1 except that 4.42 g of sodium ethoxide was used in place of sodium methoxide and the amount of propyleneoxide was changed to 102 g to obtain 97 g of the desired polyoxypropyleneglycol monoethylether.

EXAMPLES 9 TO 11 AND COMPARATIVE EXAMPLE 5

The compatibility with R-134a of the compounds obtained in Preparation Examples 9 to 11 and polyoxypropyleneglycol having a butyl ether group at the one terminal and a hydroxyl group at the other terminal was measured.

A specified sample was added into a pressure glass ampule so that the amount of the sample would be 10% by weight or 20% by weight to R-134a (1,1,1,2tetrafluoroethane), and this was jointed to a vacuum pipe and R-134a gas pipe. Afterwards, the ampule was subjected to vacuum degassing at room temperature, and cooled with liquid nitrogen to take out the specified R-134a. Then, the ampule was sealed, heated from −40° C. in a thermostat and starting temperature of phase separation was measured. The results were shown in Table 2. The higher phase separation temperature is preferable.

TABLE 2

| No. | Sample | From | Viscosity (cSt) 40° C. | Viscosity (cSt) 100° C. | Viscosity Index | Starting Temperature of Phase Separation (° C.) Ratio of polyglycol to 1,1,1,2-tetrafluoroethan (wt %) 10% | Starting Temperature of Phase Separation (° C.) Ratio of polyglycol to 1,1,1,2-tetrafluoroethan (wt %) 20% |
|---|---|---|---|---|---|---|---|
| Example 9 | Polyoxypropyleneglycol monomethylether | Product of Preparation Example 9 | 48.2 | 9.45 | 184 | 71.5 | 74.0 |
| Example 10 | Polyoxypropyleneglycol monomethylether | Product of Preparation Example 10 | 57.4 | 10.98 | 186 | 62.5 | 66.5 |
| Example 11 | Polyoxypropyleneglycol monoethylether | Product of Preparation Example 11 | 62.13 | 11.70 | 187 | 58.0 | 60.0 |
| Comparative Example 5 | Polyoxypropyleneglycol mono-n-butylether | Unilube MB-11 Produced by Nippon Oil &Fats Co., Ltd. | 56.1 | 10.8 | 187 | 51.5 | 54.0 |

EXAMPLES 12 TO 16 AND COMPARATIVE EXAMPLES 6 TO 9

For various kinds of polyoxyalkyleneglycol derivatives as sample oil, the starting temperature of phase separation (critical solution temperature) was determined according to the following test method.

In a 10 milliliter-glass autoclave, the sample oil and the refrigerant (R-134a) in a ratio of 1:9 (by weight) were placed and sealed, then gradually heated from the state of homogeneous solution, and the temperature at which the sample oil and refrigerant began to separate was measured as the critical solution temperature. The results are shown in Table 3.

TABLE 3

| No. | Polyoxyalkyleneglycol derivative of General Formula (III) $R^6$ | Polyoxyalkyleneglycol derivative of General Formula (III) $R^7$ | p + q | p / q | Kinematic Viscosity (cSt) 100° C. | Critical Solution Temperature (° C.) |
|---|---|---|---|---|---|---|
| Example 12 | Methyl group | Methyl group | 40 | 1 | 24.0 | 49.0 |
| Comparative Example 6 | Methyl group | Methyl group | 40 | 0 | 22.4 | 9.5 |
| Comparative Example 7 | Butyl group | Hydrogen | 36 | 1 | 25.7 | 32.0 |
| Comparative Example 8 | Butyl group | Hydrogen | 34 | 0 | 21.8 | Separated |
| Example 13 | Methyl group | Methyl group | 20 | 1 | 9.50 | 74.0 |
| Example 14 | Methyl group | Methyl group | 6 | 1 | 2.86 | 90.0 or higher |
| Example 15 | Methyl group | Hydrogen | 32 | 1 | 21.9 | 41.0 |
| Comparative Example 9 | Methyl group | Hydrogen | 32 | 0 | 22.9 | 5.0 |
| Example 16 | Methyl group | Hydrogen | 22 | 1 | 9.45 | 73.0 |

As the above Table 3 shows, comparison of sample oils having similar values in kinematic viscosity shows that the sample oils in Examples have higher critical solution temperatures than those of sample oils of the Comparative Examples (Example 12 and Comparative Examples 6 to 8, Example 12 and Comparative Example 9, for instance).

EXAMPLES 17 TO 21 AND COMPARATIVE EXAMPLES 10 TO 24

Various kinds of polyoxyalkyleneglycol derivatives and the blends of them with various additives were used as sample oils, which were measured for critical solution temperature, stability, anti-wear property and anti-seizure property according to the following test methods.

Kinematic viscosities of all sample oils were unified to about 11 cSt (100° C.).

(1) Critical Solution Temperature

In a glass autoclave with a capacity of about 10 ml, sample oil and refrigerant (R-134a) were placed in the ratio of 1:9 (by weight) and sealed, then gradually heated up from the state of homogeneous solution. The temperature at which sample oil and refrigerant began to separate was measured to be regarded as critical solution temperature.

(2) Stability

Evaluation was effected by Shield Tube Test.

A 2:1 mixture of the sample oil and the refrigerant (R-134a) was placed, together with a catalyst of iron, copper, or aluminum, in a glass tube and sealed, and then heated at 175° C. for 720 hours. Then the appearance of the oil and the catalyst were observed, and the total acid number was determined.

(3) Anti-wear Property

Evaluation was performed by Falex Wear Test.

The amount worn was determined with the blowing amount of R-134a of 10 liters/hour, load of 300 pounds, and a period of 1

(4) Anti-Seizure Property

Evaluation was made by Falex Seizure Test.

According to ASTM D 3233, seizing load (pound) was determined with the blowing amount of R-134a of 10 liters/hour. The results are shown in Table 4.

TABLE 4

|  |  | Example |  |  |  |  | Comparative Example |  |  |  |  |
|---|---|---|---|---|---|---|---|---|---|---|---|
|  |  | 17 | 18 | 19 | 20 | 21 | 10 | 11 | 12 | 13 | 14 |
| Dihydroxypolyoxypropyleneglycol | | 99 | — | — | — | — | — | — | — | — | — |
| Polyoxypropyleneglycol monomethylether | | — | 99 | — | — | — | — | — | 99 | 99 | 99 |
| Polyoxypropyleneglycol dimethylether | | — | — | 99 | — | — | — | — | — | — | — |
| Ethyleneoxide-Propyleneoxide copolymer dimethylether | | — | — | — | 98 | — | — | — | — | — | — |
| Glycerolpropyleneoxide adduct | | — | — | — | — | 99 | — | — | — | — | — |
| Polyoxypropyleneglycol monobutylether | | — | — | — | — | — | 99 | — | — | — | — |
| Polyoxypropyleneglycol dibutylether | | — | — | — | — | — | — | 99 | — | — | — |
| Tricresyl phosphate | | 1 | 1 | 1 | 2 | 1 | 1 | 1 | — | — | — |
| Dicresyl phosphate | | — | — | — | — | — | — | — | 1 | — | — |
| Trinonylphenyl phosphate | | — | — | — | — | — | — | — | — | 1 | — |
| Triphenyl phosphite | | — | — | — | — | — | — | — | — | — | 1 |
| Zinc Dithiophosphate | | — | — | — | — | — | — | — | — | — | — |
| Dioctyl sulfide | | — | — | — | — | — | — | — | — | — | — |
| Critical Solution Temperature (° C.) | | 67.5 | 67.5 | 66.5 | 67.5 | 67.5 | 58.5 | 52.5 | 67.5 | Room temperature (cloudy) | 67.5 |
| Stability | Appearance (oil) | Good | Good | Good | Good | Good | Good | Good | Good | not determined | Good |
| (Refrigerant: Flon 134a) | Catalyst | Good | Good | Good | Good | Good | Good | Good | Good | not determined | Good |
|  | Total Acid Number | 0.1 or less | 0.1 or less | 0.1 or less | 0.1 or less | 0.1 or less | 0.1 or less | 0.1 or less | 0.5 or more | not determined | 0.5 or more |
| Amount Worn (300 pounds × hr)(mg) | | 3 | 4 | 5 | 4 | 5 | 5 | 5 | 5 | not determined | 5 |
| Anti-Seizure Property (pounds) | | 800 | 800 | 800 | 800 | 800 | 800 | 800 | 800 | not determined | 800 |

|  |  | Comparative Example |  |  |  |  |  |  |  |  |  |
|---|---|---|---|---|---|---|---|---|---|---|---|
|  |  | 15 | 16 | 17 | 18 | 19 | 20 | 21 | 22 | 23 | 24 |
| Dihydroxypolyoxypropyleneglycol | | — | — | — | 100 | — | — | — | — | — | — |
| Polyoxypropyleneglycol monomethylether | | 99 | 99 | — | — | 100 | — | — | — | — | — |
| Polyoxypropyleneglycol dimethylether | | — | — | — | — | — | 100 | — | — | — | — |
| Ethyleneoxide-Propyleneoxide copolymer dimethylether | | — | — | — | — | — | — | 100 | — | — | — |
| Glycerolpropyleneoxide adduct | | — | — | — | — | — | — | — | 100 | — | — |
| Polyoxypropyleneglycol monobutylether | | — | — | 99 | — | — | — | — | — | 100 | — |
| Polyoxypropyleneglycol dibutylether | | — | — | — | — | — | — | — | — | — | 100 |
| Tricresyl phosphate | | — | — | — | — | — | — | — | — | — | — |
| Dicresyl phosphate | | — | — | 1 | — | — | — | — | — | — | — |
| Trinonylphenyl phosphate | | — | — | — | — | — | — | — | — | — | — |
| Triphenyl phosphite | | — | — | — | — | — | — | — | — | — | — |
| Zinc Dithiophosphate | | 1 | — | — | — | — | — | — | — | — | — |
| Dioctyl sulfide | | — | 1 | — | — | — | — | — | — | — | — |
| Critical Solution Temperature (° C.) | | 67.5 | 67.5 | 58.5 | 67.0 | 67.0 | 67.0 | 67.0 | 66.5 | 57.5 | 52.0 |
| Stability | Appearance (oil) | colored (yellow) | colored (yellow) | Good | Good | Good | Good | Good | Good | Good | Good |
| (Refrigerant: Flon 134a) | Catalyst | colored (Fe) | colored (Fe) | Good | Good | Good | Good | Good | Good | Good | Good |
|  | Total Acid Number | 0.5 or more | 0.1 or lees | 0.5 or more | 0.1 or less | 0.1 or less | 0.1 or less | 0.1 or less | 0.1 or less | 0.1 or less | 0.1 or less |
| Amount Worn (300 pounds × hr)(mg) | | 7 | 7 | 5 | 5 | 5 | 5 | 5 | 5 | 5 | 5 |
| Anti-Seizure Property (pounds) | | 650 | 500 | 800 | 600 | 600 | 600 | 600 | 600 | 600 | 600 |

As is clear from the above Table 4, the sample oil of Examples are higher in critical solution temperature and also superior in anti-seizure property, compared with Comparative Examples.

EXAMPLES 22 TO 24 AND COMPARATIVE EXAMPLES 27 TO 31

On the components shown in Table 5, critical solution temperature of the solutions made by blending the sample oil and fluorine-containing refrigerant R-134a in a ratio 1:9 by weight. The result is shown in Table 5.

TABLE 5

| No. | Component | Viscosity (40° C.)cSt | Critical Solution Temperature[1] low (° C.) | Critical Solution Temperature[1] high (° C.) |
|---|---|---|---|---|
| Example 22 | Glycerolpropyleneoxide adduct[2] (trifunctional group) | 116 | −50 or lower | 80 |
| Example 23 | Glycerolpropyleneoxide adduct[3] (trifunctional group) | 96 | −50 or lower | 77 |
| Example 24 | Glycerolpropyleneoxide adduct[4] (trifunctional group) | 103 | −50 or lower | 57 |
| Comparative Example 27 | Polypropyleneglycolmonobutylether[5] (monofunctional group) | 105 | −42 | 8 |
| Comparative Example 28 | Polypropyleneglycol[6] (bifunctional group) | 150 | −37 | 7 |
| Comparative Example 29 | Trimethylolpropanepropyleneoxide[7] adduct (trifunctional group) | 194 | not dissolved[10] | not dissolved[10] |
| Comparative Example 30 | Sorbitol propyleneoxide adduct[8] (hexafunctional group) | 4275 | not dissolved[10] | not dissolved[10] |
| Comparative Example 31 | Glycerolpropyleneoxide adduct[9] (trifunctional group) | 304 | not dissolved[10] | not dissolved[10] |

Notes:
Water content of each sample oil of Examples and Comparative Examples are all prepared to be 300 ppm.
[1]Test method of Critical Solution Temperature In a glass pressure container with a capacity of about 10 ml, sample oil and refrigerant (R-134a) was placed in a ratio of 1:9, and sealed. The homogeneous solution was cooled gradually on the lower temperature side, to find the temperature at which oil and refrigerant separated. On the higher temperature side, the solution was gradually lowered in its temperature, and the temperature at which the oil and refrigerant separated was found similarly.
[2]Sannix GP 400, produced by Sanyo Chemical Industries, Ltd.
[3]Sannix GP 600, produced by Sanyo Chemical Industries, Ltd.

TABLE 5-continued

| No. | Component | Viscosity (40° C.)cSt | Critical Solution Temperature[1] low (° C.) | Critical Solution Temperature[1] high (° C.) |
|---|---|---|---|---|

[4]Sannix GP 1000, produced by Sanyo Chemical Industries, Ltd.
[5]Unilube MB 19, produced by Nippon Oil &Fats Co., Ltd.
[6]Sannix PP 2000, produced by Sanyo Chemical Industries, Ltd.
[7]Sannix TP 400, produced by Sanyo Chemical Industries, Ltd-
[8]Sannix SP 750, produced by Sanyo Chemical Industries, Ltd.
[9]Sannix GP 4000, produced by Sanyo Chemical Industries, Ltd.
[10]Insoluble with the refrigerant (R-134a) at ordinary temperature.

The components of Examples 22 to 24 are low in low-temperature critical solution temperature, and high in high-temperature critical solution temperature. It shows that at operation temperature, operation can be favorably effected without two-phase separation of refrigerant and refrigerator oil.

EXAMPLES 25 TO 27 AND COMPARATIVE EXAMPLES 32 TO 34

6 g of a mixture of sample oil and R-134a in the ratio of 2:1 by weight was placed in glass tubes together with iron wire, copper wire and aluminum wire each with a diameter of 1.5 Mm and a length of 40 Mm, and sealed. After maintained at 175° C. for 30 days and for 60 days, changes in the surface of each metal wire were observed by visual inspection.

No change was seen on the surface of copper or aluminum, but the surface of iron wire showed changes with some kinds of samples. The results of the observation of iron wire are shown in Table 6. It was confirmed that those having small water content showed no change.

TABLE 6

| No. | Component | Shield Tube Test (Refrigerant: Flon 134a) 175° C. × 30 days Appearance of Iron Wire | Shield Tube Test (Refrigerant: Flon 134a) 175° C. × 30 days Appearance of Iron Wire |
|---|---|---|---|
| Example 25 | Glycerolpropyleneoxide adduct (trifunctional group) (Water content: 300 ppm) | No change (slight decrease in luster) | No change (decrease in luster) |
| Example 26 | Glycerolpropyleneoxide adduct[1] (trifunctional group) (Water content: 150 ppm) | No change | No change (slight decrease in luster) |
| Example 27 | Glycerolpropyleneoxide adduct[1] (trifunctional group) (Water content: 50 ppm) | No change | No change |
| Comparative Example 32 | Glycerolpropyleneoxide adduct[2] (trifunctional group) (Water content: 1000 ppm) | No change (luster lost) | Slight change |
| Comparative Example 33 | Glycerolpropyleneoxide adduct[3] (trifunctional group) (Water content: 1%) | Slight change | discoloring |

TABLE 6-continued

| | | Shield Tube Test (Refrigerant: Flon 134a) | |
|---|---|---|---|
| No. | Component | 175° C. × 30 days Appearance of Iron Wire | 175° C. × 30 days Appearance of Iron Wire |
| Comparative Example 34 | Glycerolpropyleneoxide adduct[3] (trifunctional group) (Water content: 5%) | discoloring | discoloring |

Notes:
[1]Example 27 was dehydrated, to prepare a sample having water content of 50 and 150 ppm.
[2]Example 27 was let to stand for 30 hours in open state, to obtain a sample having a water content of 1000 ppm.
[3]Example 27 was added with water, to prepare samples having a water content of 1% and 5% each,

EXAMPLES 28 TO 33 AND COMPARATIVE EXAMPLES 35

Refrigerator oils having the compositions shown in Table 7 were prepared. Into a 10 milliliter-glass autoclave, said refrigerator oils were each placed with R-134a as the refrigerant in a ratio of 1:9 by weight and sealed, then gradually heated up from the state of homogeneous solution. The temperature at which the oil and the refrigerant separate was measured to be regarded as critical solution temperature. The results are shown in Table 7.

TABLE 7

| | Composition of Refrigerator Oil (wt %) | | | | | | Critical Solution Temperature (° C.) |
|---|---|---|---|---|---|---|---|
| | Component (a) | | Amount of Component (b) | | | | |
| No. | Kind* | Amount | (i) | (ii) | (iii) | (iv) | |
| Example 28 | A-1 | 87 | 13 | — | — | — | 62.0 |
| Example 29 | A-1 | 76 | — | 24 | — | — | 64.0 |
| Example 30 | A-1 | 89 | — | — | 11 | — | 57.5 |
| Example 31 | A-1 | 90 | — | — | — | 10 | 59.0 |
| Example 32 | A-1 | 99.9 | — | 0.1 | — | — | 53.5 |
| Comparative Example 35 | A-1 | 100 | — | — | — | — | 51.5 |
| Example 33 | A-2 | 80 | — | 20 | — | — | 67.5 |

*A-1: Unilube MB 11 (Polypropyleneglycol monobutylether, produced by Nippon Oil &Fats Co., Ltd.)
A-2: Sannix GP 1000 (Propyleneoxide adduct of glycerol, produced by Sanyo Chemical Industries, Ltd.)
(i): Dioctyl adipate DOA (dibasic acid ester, produced by Mitsubishi Monsant Co., Ltd.)
(ii): Daifloil 10 (fluorinated oil, produced by Daikin Industries Co., Ltd.)
(iii): Unistar H-306 (polyhydric alcohol ester, produced by Nippon Oil &Fats Co., Ltd.)
(iv): LS-8210 (fluorosilicone, produced by Shin-etsu Chemical Industry)

EXAMPLES 34 TO 37

Various kinds of polyoxylalkylene glycol derivatives having formula (XIX) were used as sample oils, which were measured for critical solution temperature according to the following test methods.

In a glass autoclave with a capacity of about 10 ml, sample oils and a refrigerant (R-134a) were placed in a ratio of 1:9 (by weight) and sealed, then gradually heated up from the state of homogeneous solution. The temperature at which the sample oil and the refrigerant began to separate was measured to be regarded as the critical solution temperature.

Load Resistance Test was performed according to ASTM 3233 by measuring the seizing load (pound) after a test run for five minutes at an oil temperature of 30° C. under a load of 150 pounds.

The result is shown in Table 8.

TABLE 8

| Example | Polypropyleneglycol derivatives | Kinetic visc. at 100° C. (cSt) | Critical solution temp. (° C.) | Load Resistance |
|---|---|---|---|---|
| Ex. 34 | Polypropyleneglycol monoallylether | 4.1 | 90 or more | 630 |
| Ex. 35 | Polypropyleneglycol monoallylether | 9.2 | 66.0 | 735 |
| Ex. 36 | Polypropyleneglycol monoallylether | 3.4 | 84.0 | 540 |
| Ex. 37 | Ethyleneoxide-propyleneoxide copolymer monoallylether | 5.2 | 86.0 | 640 |

| No. | Average number of alkylene oxide units | Average molecular weight |
|---|---|---|
| Example 34 | 7.6 | 500 |
| Example 35 | 14.5 | 900 |
| Example 36 | 6.1 | 500 |
| Example 37 | 4.3 &4.3* | 500 |

*Numbers of EO units and PO units are 4.3, respectively.

In Table 8, "Critical solution temperature" means the phase separation temperature of polyoxyalkyleneglycol derivative and R-134a. It will be observed that the polyoxyalkyleneglycol derivatives in Examples 34 to 37 have higher critical solution temperatures than those exhibited by the glycols shown in the Comparative Examples, thus these derivatives are shown to have excellent compatibility with R-134a.

EXAMPLES 38 TO 40

In the same manner as in Examples 1 to 8 additional experiments on the compatibility of each sample of the polyoxyalkyleneglycol derivative having two alkyl terminal groups with R-134a were carried out. The results are shown in the following table.

TABLE 9

| Sample | Kinetic viscosity (cSt:100°) | Phase separation Temperature (° C.) (Concentration 10%) | Remarks |
|---|---|---|---|
| A | 7.5 | 79.5 | Example 7 |
| B | 9.1 | 74.0 | New Example 38 |
| C | 9.8 | 71.5 | New Example 39 |
| D | 9.5 | 74.0 | Example 13 |
| E | 9.0 | 70.0 | Example 5 |
| F | 8.7 | 61.0 | New Example 40 |

A: Methylether derivative of dihydroxypolyoxypropyleneglycol Me-$(PO)_m$-Me
B: Methylether derivative of dihydroxypolyoxypropyleneglycol
C: Methylether derivative of dihydroxypolyoxypropyleneglycol
D: Me-$(PO)_m(EO)_n$-Me, m:n = 1.1
E: Ethylether derivative of dihydroxypolyoxypropyleneglycol Et-$(PO)_m$-Et
F: Ethylbutylether derivative of dihydroxypolyoxypropyleneglycol, Et-$(PO)_m$-Bu TABLE 9-continued

| No. | Average number of alkylene oxide units | Average molecular weight |
|---|---|---|
| A | 17.1 | 1040 |
| B | 19.6 | 1180 |

TABLE 10

| | Composition | | Properties | | | | |
|---|---|---|---|---|---|---|---|
| | | | | Suitability | Peeling | | |
| | | $(C_2H_4O)$ | Antiwear | to Sealing | of | Phase Separation (° C.) | |
| | Component | Content (wt %) | Property (mg) | Antiwear (%)*1 | Coating Material | R-134a | R-12 |
| Example 40 | Mixture of Compounds A and B | 3 | 20 or less | 16.8 | No | 70 or more | 70 or more |
| Example 41 | Mixture of Compounds A and B | 10 | 20 or less | 17.0 | No | 70 or more | 70 or more |
| Example 42 | Mixture of Compounds A and B | 20 | 20 or less | 17.9 | No | 70 or more | 70 or more |
| Example 43 | Compound C only | 10 | 20 or less | 17.5 | No | 70 or more | 70 or more |
| Example 44 | Compound C only | 20 | 20 or less | 18.0 | No | 70 or more | 70 or more |

Compound A: $CH_3O(C_3H_6O)_mCH_3$ (Kinematic Viscosity at 100° C.: 9.1 cSt)
Compound B: $CH_3O(C_2H_4O)_x(C_3H_6O)_yCH_3$ x = y = 9.1 (Content of $C_2H_4O$ Unit: 41%)
Compound C: $CH_3O(C_2H_4O)_x(C_3H_6O)_yCH_3$ Content of $C_2H_4O$ unit was adjusted as per the Table.
*1: Ratio of change in Volume TABLE 9-continued

| C | 20.1 | 1210 |
|---|---|---|
| D | 9.1 & 9.1* | 970 |
| E | — | — |
| F | — | — |

*Numbers of EO units and PO units are 9.1, respectively.

EXAMPLES 41 TO 44

Components (A), (B) and (C) shown below were used independently or mixed, to prepare refrigerator oils varying in ethylene oxide unit $(C_2H_4O)$ content. These refrigerator oils as sample oils were evaluated for the properties as follows. The results are shown in Table 10.

(a) Antiwear Property

According to Falex Wear Test, evaluation was made using aluminum blocks (A4032), and steel pins (SUJ-2). The amount worn was determined with a blow amount of R-134a of 10 liters/hour, a load of 300 pounds, and a period of 1 hour.

(b) Suitability to Sealing Materials (in According with JIS K6301)

High nitrile rubber was used as the sealing material, and the ratio of change in volume at 130° C. after 72 hours was measured.

(c) Peeling Property of Coating Material

The refrigerator oil was dropped onto the outer wall of the receiver tank of a refrigerator coated with synthetic resin, left for 24 hours, and then the oil drops were wiped out with thin cotton cloth. At that wiping, it was observed whether the coating was peeled off or not.

(d) Compatibility with Refrigerant (Phase Separation Temperature)

Into a glass autoclave with a capacity of about 10 ml, sample oil and refrigerant (R-134a or R-12) are placed in homogeneous solution were gradually heated to find a temperature at which the sample oil and the refrigerant began to separate, which was regarded as the phase separation temperature.

What is claimed is:

1. A refrigerant composition comprising a lubricating oil and a hydrogen-containing fluorocarbon as a refrigerant, wherein the lubricating oil contains, as a main component, a polyoxyalkyleneglycol derivative having the formula $CH_3$—$(OC_3H_6)_m$—$OCH_3$, wherein m is an integer of 1 to 80, wherein the polyoxyalkyleneglycol derivative has a kinematic viscosity of 2 to 9.70 cSt at 100°C.

2. A method for effecting lubrication in compression-type refrigerators using a refrigerant, said method comprising employing, as a lubricant, a lubricating oil comprising, as a main component, a polyoxyalkyleneglycol derivative having the formula $CH_3$—$(OC_3H_6)_m$—$OCH_3$, where m is an integer of 1 to 80, wherein the polyoxyalkyleneglycol derivative has a kinematic viscosity of 2 to 9.70 cSt at 100°C.

3. A method for effecting lubrication in compression-type refrigerators according to claim 2, wherein the refrigerant is hydrogen-containing fluorocarbon.

4. A compression-type refrigerator system which comprises a compressor, a refrigerant, and a lubricant, said lubricant comprising the lubricating oil according to claim 1.

5. A compression-type refrigerator system according to claim 4, wherein the refrigerant comprises a hydrogen-containing fluorocarbon compound.

6. A refrigerant composition according to claim 1, wherein said hydrogen-containing fluorocarbon does not comprise chlorine.

* * * * *

UNITED STATES PATENT AND TRADEMARK OFFICE
CERTIFICATE OF CORRECTION

| | | |
|---|---|---|
| PATENT NO. | : 7,531,488 B2 | Page 1 of 1 |
| APPLICATION NO. | : 09/939599 | |
| DATED | : May 12, 2009 | |
| INVENTOR(S) | : Kawaguchi et al. | |

It is certified that error appears in the above-identified patent and that said Letters Patent is hereby corrected as shown below:

Title Page, Item [*]

Delete the phrase "by 937 days" and insert -- by 1,505 days --.

Signed and Sealed this

Thirty-first Day of August, 2010

David J. Kappos
*Director of the United States Patent and Trademark Office*